US007620251B2

(12) United States Patent
Akahori

(10) Patent No.: US 7,620,251 B2
(45) Date of Patent: Nov. 17, 2009

(54) APPARATUS FOR SELECTING IMAGE OF SPECIFIC SCENE, PROGRAM THEREFOR, AND RECORDING MEDIUM STORING THE PROGRAM

(75) Inventor: Sadato Akahori, Kanagawa-kne (JP)

(73) Assignee: FUJIFILM Corporation, Tokyo (JP)

( * ) Notice: Subject to any disclaimer, the term of this patent is extended or adjusted under 35 U.S.C. 154(b) by 661 days.

(21) Appl. No.: 11/087,731

(22) Filed: Mar. 24, 2005

(65) Prior Publication Data
US 2005/0220341 A1 Oct. 6, 2005

(30) Foreign Application Priority Data
Mar. 24, 2004 (JP) ............................. 2004-086885
Mar. 23, 2005 (JP) ............................. 2005-083911

(51) Int. Cl.
H04N 7/18 (2006.01)
G06K 9/62 (2006.01)
G06K 9/68 (2006.01)
G06K 9/00 (2006.01)

(52) U.S. Cl. ........................ 382/224; 382/181; 382/218; 348/135

(58) Field of Classification Search ................. 382/224; 707/104
See application file for complete search history.

(56) References Cited
U.S. PATENT DOCUMENTS
6,014,461 A * 1/2000 Hennessey et al. .......... 382/195

7,136,508 B2 * 11/2006 Asano et al. ................ 382/107
2003/0012447 A1 * 1/2003 Pawlewski et al. .......... 382/253
2003/0030753 A1 * 2/2003 Kondo et al. ................ 348/625
2003/0031376 A1 * 2/2003 Liu ............................. 382/266
2005/0075537 A1 * 4/2005 Chen et al. .................. 600/109

FOREIGN PATENT DOCUMENTS
JP     11-196324 A    7/1999
JP     11-298736 A    10/1999

* cited by examiner

Primary Examiner—Bhavesh M Mehta
Assistant Examiner—Hadi Akhavannik
(74) Attorney, Agent, or Firm—Sughrue Mion, PLLC

(57) ABSTRACT

Images of various scenes can be classified with high accuracy by considering a characteristic part corresponding to a desired one of the scenes in the images and a change in position or area proportion thereof caused by composition difference. A local characteristic quantity image generation portion generates local characteristic quantity images from a target image input from an image input reception portion. A representative characteristic quantity calculation portion calculates representative characteristic quantities for each of the local characteristic quantity images from a result of sum-of-product calculations obtained by shifting and/or distribution change of masks of a type previously related to a type of the local characteristic quantity images in the corresponding local characteristic quantity image. An identification portion compares values of the representative characteristic quantities to identification conditions stored in a memory and judges whether the target image is of the specific scene.

17 Claims, 26 Drawing Sheets

FIG.2

REFERENCE DATA

| SCENE | TYPE OF LOCAL CHARACTERISTIC QUANTITY IMAGES | TYPE OF MASKS | TYPE OF REPRESENTATIVE CHARACTERISTIC QUANTITIES | IDENTIFICATION CONDITIONS |
|---|---|---|---|---|
| NIGHT VIEW | #41 (ANY HUE, NO SATURATION, LOW LIGHTNESS, NO TEXTURE) 5X5 | 2X2 UNIFORM | (MAXIMUM) -(MINIMUM) | -2.5,-2.4, · · · 3.1,3.5 |
| | #49 (ANY HUE, ANY SATURATION, HIGH LIGHTNESS, NO TEXTURE) 5X5 | 3X3 UNIFORM | MAXIMUM | -3.2,-3.4, · · · 4.0,3.9 |
| | #43 (ANY HUE, NO SATURATION, HIGH LIGHTNESS, NO TEXTURE) 5X5 | PEAK-SHAPE, WIDTH 3 | MAXIMUM | -2.2,-2.5, · · · 2.8,3.2 |
| SUNSET | #59 (ORANGE, HIGH SATURATION, ANY LIGHTNESS, SIMPLE TEXTURE) 5X5 | INCLINATION, WIDTH 4 | MAXIMUM | -5.8,-5.8, · · · 4.7,5.0 |
| | #83 (RED, HIGH SATURATION, ANY LIGHTNESS, COMPLEX TEXTURE) 5X5 | INCLINATION, WIDTH 2 | MEDIAN | -3.4,-2.8, · · · 3.3,3.1 |

FIG.4

| HUE ANGLE | SATURATION | LIGHTNESS | TEXTURE INDEX VALUE | | | |
|---|---|---|---|---|---|---|
| | | | ANY | NONE (0~2) | LOW (2~12) | HIGH (12~) |
| RED (10°~43°) | LOW (10~60) | ANY | #0 | #25 | #50 | #75 |
| ORANGE (43°~79°) | | | #1 | #26 | #51 | #76 |
| YELLOW (79°~100°) | | | #2 | #27 | #52 | #77 |
| GREEN (100°~148°) | | | #3 | #28 | #53 | #78 |
| CYAN (148°~227°) | | | #4 | #29 | #54 | #79 |
| BLUE (227°~306°) | | | #5 | #30 | #55 | #80 |
| VIOLET (306°~325°) | | | #6 | #31 | #56 | #81 |
| MAGENTA (325°~10°) | | | #7 | #32 | #57 | #82 |
| RED (10°~43°) | HIGH (10~60) | | #8 | #33 | #58 | #83 |
| ORANGE (43°~79°) | | | #9 | #34 | #59 | #84 |
| YELLOW (79°~100°) | | | #10 | #35 | #60 | #85 |
| GREEN (100°~148°) | | | #11 | #36 | #61 | #86 |
| CYAN (148°~227°) | | | #12 | #37 | #62 | #87 |
| BLUE (227°~306°) | | | #13 | #38 | #63 | #88 |
| VIOLET (306°~325°) | | | #14 | #39 | #64 | #89 |
| MAGENTA (325°~10°) | | | #15 | #40 | #65 | #90 |
| ANY | NONE(0~10) | LOW(0~35) | #16 | #41 | #66 | #91 |
| | | INTERMEDIATE (35~65) | #17 | #42 | #67 | #92 |
| | | HIGH(65~) | #18 | #43 | #68 | #93 |
| ANY | NONE(0~10) | ANY | #19 | #44 | #69 | #94 |
| | LOW(10~60) | | #20 | #45 | #70 | #95 |
| | HIGH(60~) | | #21 | #46 | #71 | #96 |
| ANY | ANY | LOW(0~35) | #22 | #47 | #72 | #97 |
| | | INTERMEDIATE (35~65) | #23 | #48 | #73 | #98 |
| | | HIGH(65~) | #24 | #49 | #74 | #99 |

| 1/N² | 1/N² | 1/N² |
|---|---|---|
| 1/N² | 1/N² | 1/N² |
| 1/N² | 1/N² | 1/N² |

—30

UNIFORM MASK (N×N; 1≤N≤4)

FIG.6A

| 1/N | 1/N | 1/N |
|---|---|---|
| 0 | 0 | 0 |
| 0 | 0 | 0 |
| 0 | 0 | 0 |
| -1/N | -1/N | -1/N |

—32

⇔ DISTRIBUTION CHANGE

| 1/2N | 1/2N | 1/2N |
|---|---|---|
| 1/2N | 1/2N | 1/2N |
| 0 | 0 | 0 |
| 0 | 0 | 0 |
| -1/N | -1/N | -1/N |

—34

⇔ DISTRIBUTION CHANGE

| 1/N | 1/N | 1/N |
|---|---|---|
| 0 | 0 | 0 |
| 0 | 0 | 0 |
| -1/2N | -1/2N | -1/2N |
| -1/2N | -1/2N | -1/2N |

—36

INCLINATION MASK (5×N; 1≤N≤5)

FIG.6B

| -1/2N | -1/2N | -1/2N |
|---|---|---|
| 0 | 0 | 0 |
| 1/N | 1/N | 1/N |
| 0 | 0 | 0 |
| -1/2N | -1/2N | -1/2N |

—38

⇔ DISTRIBUTION CHANGE

| -1/2N | -1/2N | -1/2N |
|---|---|---|
| 1/N | 1/N | 1/N |
| 0 | 0 | 0 |
| 0 | 0 | 0 |
| -1/2N | -1/2N | -1/2N |

—40

⇔ DISTRIBUTION CHANGE

| -1/2N | -1/2N | -1/2N |
|---|---|---|
| 0 | 0 | 0 |
| 0 | 0 | 0 |
| 1/N | 1/N | 1/N |
| -1/2N | -1/2N | -1/2N |

—42

PEAK-SHAPE MASK (5×N; 1≤N≤5)

EXECUTING ENVIRONMENT-COMPUTING AMOUNT DATA

| PERFORMANCE OF CPU | LIMIT OF AMOUNT OF OPERATION |
|---|---|
| A | 120 |
| B | 100 |
| C | 80 |

FIG.13

REPRESENTATIVE CHARACTERISTIC QUANTITY–CALCULATION AMOUNT DATA

| SCENE | TYPE OF LOCAL CHARACTERISTIC QUANTITY IMAGES | TYPE OF MASKS | TYPE OF REPRESENTATIVE CHARACTERISTIC QUANTITIES | CALCULATION AMOUNT POINTS |
|---|---|---|---|---|
| NIGHT | #41 (ANY HUE, NO SATURATION, LOW LIGHTNESS, NO TEXTURE) 5X5 | 2X2 UNIFORM | (MAXIMUM) -(MINIMUM) | 30 |
| | #49 (ANY HUE, ANY SATURATION, HIGH LIGHTNESS, NO TEXTURE) 5X5 | 3X3 UNIFORM | MAXIMUM | 40 |
| | #43 (ANY HUE, NO SATURATION, HIGH LIGHTNESS, NO TEXTURE) 5X5 | PEAK-SHAPE, WIDTH 3 | MAXIMUM | 50 |
| | ...... | ...... | ...... | ...... |

FIG.14

PERFORMANCE OF CPU:A(HIGH)

| SCENE | TYPE OF LOCAL CHARACTERISTIC QUANTITY IMAGES | TYPE OF MASKS | TYPE OF REPRESENTATIVE CHARACTERISTIC QUANTITIES | IDENTIFICATION CONDITIONS |
|---|---|---|---|---|
| NIGHT | #41 (ANY HUE, NO SATURATION, LOW LIGHTNESS, NO TEXTURE) 5X5 | 2X2 UNIFORM | (MAXIMUM) -(MINIMUM) | -2.5,-2.4, · · 3.1,3.5 |
|  | #49 (ANY HUE, ANY SATURATION, HIGH LIGHTNESS, NO TEXTURE) 5X5 | 3X3 UNIFORM | MAXIMUM | -3.2,-3.4, · · 4.0,3.9 |
|  | #43 (ANY HUE, NO SATURATION, HIGH LIGHTNESS, NO TEXTURE) 5X5 | PEAK-SHAPE, WIDTH 3 | MAXIMUM | -2.2,-2.5, · · 2.8,3.2 |
| SUNSET | · · | · · | · · | · · |

PERFORMANCE OF CPU:B(INTERMEDIATE)

| SCENE | TYPE OF LOCAL CHARACTERISTIC QUANTITY IMAGES | TYPE OF MASKS | TYPE OF REPRESENTATIVE CHARACTERISTIC QUANTITIES | IDENTIFICATION CONDITIONS |
|---|---|---|---|---|
| NIGHT | #41 (ANY HUE, NO SATURATION, LOW LIGHTNESS, NO TEXTURE) 5X5 | 2X2 UNIFORM | (MAXIMUM) -(MINIMUM) | -2.5,-2.4, · · 3.1,3.5 |
|  | #43 (ANY HUE, NO SATURATION, HIGH LIGHTNESS, NO TEXTURE) 5X5 | PEAK-SHAPE, WIDTH 3 | MAXIMUM | -2.2,-2.5, · · 2.8,3.2 |
| SUNSET | · · | · · | · · | · · |

PERFORMANCE OF CPU:C(LOW)

| SCENE | TYPE OF LOCAL CHARACTERISTIC QUANTITY IMAGES | TYPE OF MASKS | TYPE OF REPRESENTATIVE CHARACTERISTIC QUANTITIES | IDENTIFICATION CONDITIONS |
|---|---|---|---|---|
| NIGHT | #41 (ANY HUE, NO SATURATION, LOW LIGHTNESS, NO TEXTURE) 5X5 | 2X2 UNIFORM | (MAXIMUM) -(MINIMUM) | -2.5,-2.4, · · 3.1,3.5 |
| SUNSET | · · | · · | · · | · · |

FIG.15

| USER SETTING | LIMIT OF CALCULATION AMOUNT POINT |
|---|---|
| HIGH QUALITY MODE | 100 |
| NORMAL MODE | 80 |

FIG.16

HIGH QUALITY MODE

| SCENE | CHARACTERISTIC QUANTITY ID | IDENTIFICATION CONDITION |
|---|---|---|
| NIGHT: | 1 | 1.3, 1.0, ... |
| | 23 | 1.7, 1.8, ... |
| | ... | ... |
| | 10 | -2.1, 0.1, ... |
| SUNSET: | ... | |
| ... : | ... | |

NORMAL MODE

| SCENE | CHARACTERISTIC QUANTITY ID | IDENTIFICATION CONDITION |
|---|---|---|
| NIGHT: | ... | ... |
| SUNSET: | ... | |
| ... : | ... | |

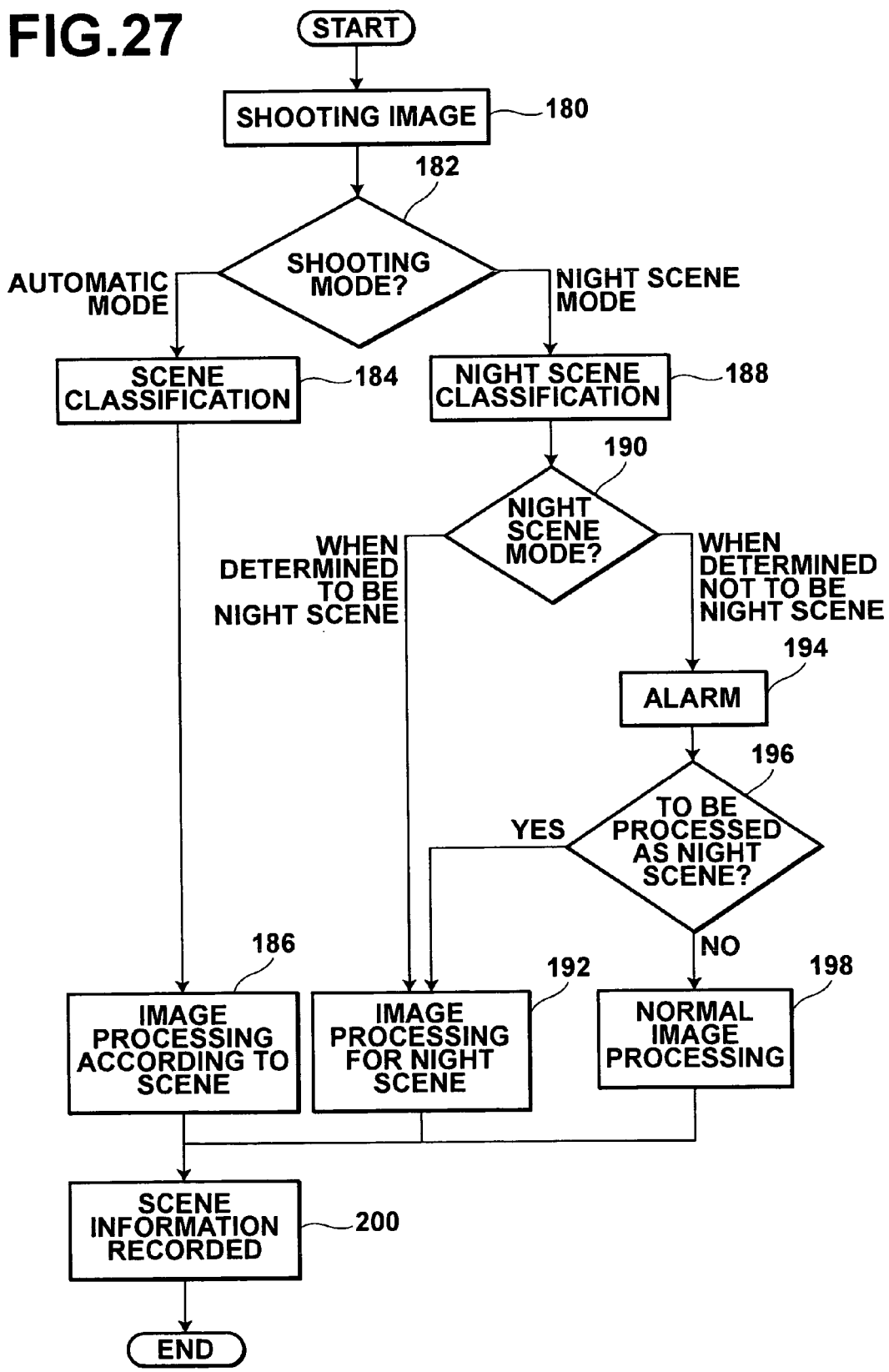

APPARATUS FOR SELECTING IMAGE OF SPECIFIC SCENE, PROGRAM THEREFOR, AND RECORDING MEDIUM STORING THE PROGRAM

BACKGROUND OF THE INVENTION

1. Field of the Invention

The present invention relates to an apparatus for selecting an image of a specific scene, to a program therefor, and to a recording medium storing the program. More specifically, the present invention relates to an apparatus for selecting images of a desired scene for classifying images represented by digital image data according to scenes, to a program therefor, and to a recording medium storing the program.

2. Description of the Related Art

Research and development of an image classifying method have been started recently. In this method, whether or not images represent a predetermined one of scenes is judged automatically for classifying the images represented by digital image data according to the scenes and for carrying out correction processing or printing corresponding to the scenes.

For example, in Japanese Unexamined Patent Publication No. 11 (1999)-298736, a method is described for specifically selecting an image of sunset. In this method, a product of hue and saturation and a product of hue and lightness of pixels belonging to a range from red to yellow in an image are indicated as a histogram, and the image is judged to be an image of sunset if variance in the histogram exceeds a reference value.

Furthermore, in Japanese Unexamined Patent Publication No. 11 (1999)-196324, a method is described for judging whether an image is a backlight photo or not, with reference to contrast and the like between areas generated by dividing the image into a center area and a peripheral area according to a predetermined manner of division that is common for all images to be judged.

However, characteristics of an image of a specific scene are represented not only by colors and lightness of the entire image but also by layout of a characteristic part having a characteristic color and lightness. For example, in an image of a scene of sunset, the sky which indicates a characteristic of sunset in the most prominent manner is usually laid out in an upper area of the image. However, in the histogram used in the method described in Japanese Unexamined Patent Publication No. 11(1999)-298736, an image having the sunset sky in an upper area thereof is dealt equally with an image of a subject at the center thereof having clothes or the like in a color and lightness similar to those of the sunset sky, which increases erroneous judgment.

Furthermore, even if a characteristic such as colors or lightness of each of the areas generated by division of an image are examined as in the method described in Japanese Unexamined Patent Publication No. 11 (1999)-196324, a change in position or an area proportion caused by a difference in composition or the like cannot be dealt with by the predetermined manner of division. For example, in the case of a scene of sunset, although the sky at sunset is laid out commonly in an upper area of each sunset image, a position of boundary between the sky and other parts (such as skyline) therein varies greatly due to composition adopted by each user. Therefore, if an image is divided according to the predetermined common manner, a part other than the sunset sky may be included in a considerable proportion in an upper area generated by the division. In this case, if a characteristic is examined in the entire upper area, probability of erroneous judgment becomes high.

SUMMARY OF THE INVENTION

The present invention has been conceived based on consideration of the above circumstances. An object of the present invention is therefore to provide an apparatus, a program and a recording medium storing the program for selecting images of various scenes with high accuracy while considering a tendency in layout of a characteristic part corresponding to a specific one of the scenes and a change in a position and in an area proportion of the characteristic part caused by a difference in composition or the like.

More specifically, a specific-scene image selection apparatus of the present invention for selecting an image of a specific scene comprises:

image input reception means for receiving input of a target image;

local characteristic quantity image generation means for generating a local characteristic quantity image or local characteristic quantity images from the target image;

representative characteristic quantity calculation means for calculating a representative characteristic quantity or representative characteristic quantities for the local characteristic quantity image or for each of the local characteristic quantity images by using a result of sum-of-product calculations obtained by shifting and/or changing distribution of a mask or masks, which are previously related to a type of the local characteristic quantity image or images, in the corresponding local characteristic quantity image; and selection means for making judgment as to whether the target image indicates the specific scene by comparing a value or values of the representative characteristic quantity or quantities with a identification condition that is previously related to a type of the representative characteristic quantity or quantities and indicates a relationship between a possible value or possible values of the representative characteristic quantity or quantities and likelihood of the specific scene.

In the present invention, the "characteristic quantity" refers to a parameter indicating a characteristic of an image. The characteristic quantity may represent any characteristic such as colors, brightness, texture, depth, and an edge. A weighted sum or the like obtained from index values indicating these characteristics such as colors, brightness, and texture may be used as the characteristic quantity. In the present invention, the "local characteristic quantity" refers to the characteristic quantity indicating a local characteristic in an area or a part of pixels in the target image. The "local characteristic quantity image" refers to an image having pixel values of the local characteristic quantity in each of divided areas or at each of the pixels in the target image. When the characteristic quantity image is generated in the present invention, the target image input in the form of data having pixel values of R, G, and B, for example, may be used as it is as the characteristic quantity image. The "representative characteristic quantity" in the present invention refers to a characteristic quantity indicating an entire characteristic of the corresponding local characteristic quantity image.

Shifting the mask or masks in the corresponding local characteristic quantity image in the present invention refers to carrying out spatial filtering processing wherein the mask or each of the masks in the form of a weighted matrix is applied to the corresponding local characteristic quantity image at a position of each of pixels or every several pixels therein and the sum-of-product values are found between matrix values in the mask and the pixel values in the local characteristic quantity image at each of the positions. In this case, the mask or masks need to have a size smaller than the corresponding local characteristic quantity image. Changing distribution in the mask or masks in the corresponding local characteristic quantity image in the present invention refers to applying the mask or each of the masks several times at any one of the pixels in the corresponding local characteristic quantity image while changing distribution of the values in the weighted matrix, such as changing a position of a peak in a "Peak-shape" mask, in order to find the values of the sum-of-product calculations for the several times. In this case, a size of the mask or masks whose distribution is changed may be the same as or smaller than the corresponding local characteristic quantity image. In the case of using the mask or masks smaller than the corresponding local characteristic quantity image, distribution change and shifting of the mask or masks can be carried out at the same time.

The specific-scene image selection apparatus of the present invention may further comprise scene specification reception means for receiving specification of a desired scene as the specific scene.

In the specific-scene image selection apparatus of the present invention, the type of the local characteristic quantity image or images generated by the local characteristic quantity image generation means, a type of the mask or masks used by the representative characteristic quantity calculation means, the type of the representative characteristic quantity or quantities calculated by the representative characteristic quantity calculation means, and the identification condition for the type of the representative characteristic quantity or quantities may be determined through learning in advance a sample image group comprising images of the specific scene and images not indicating the specific scene.

In the specific-scene image selection apparatus of the present invention, the pixel values in the local characteristic quantity image or at least one of the local characteristic quantity images may be values of a local characteristic quantity indicating probability of a pixel corresponding to an area having a combination of a plurality of characteristics. In this case, the combination of the characteristics may be a combination of two or more characteristics selected from a group comprising characteristics of hue, saturation, lightness and texture.

In the case where the types of local characteristic quantity images and the like are determined through the learning in the above manner, the learning regarding the specific scene may comprise the steps of:

defining a plurality of combinations of the type of the local characteristic quantity image or images, the type of the mask or masks, and the type of the representative characteristic quantity or quantities that can be used for the judgment of the specific scene;

selecting one or more of the combinations as a combination of the type of the local characteristic quantity image or images, the type of the mask or masks, and the type of the representative characteristic quantity or quantities used for identification of an image of the specific scene, wherein the representative characteristic quantity or quantities of the type specified in each of the combinations are calculated from each of the images comprising the sample image group by using the local characteristic quantity image or images and the mask or masks of the types in the corresponding combination, and trial selection is carried out for setting a identification criterion for judging whether each of the images in the sample image group is an image of the specific scene, and the combination or the combinations are selected in order of higher accuracy of the identification criterion in the trial selection; and determining the identification condition with reference to the identification criterion set for the selected combination or for each of the selected combinations.

When the combination or combinations are selected in order of higher accuracy in the trial selection, a weight of each of the images in the sample image group may be changed at each time the combination whose identification criterion is of the highest accuracy is selected. In this case, the combination whose identification criterion shows the highest accuracy for the sample image group whose weight has been changed is selected serially.

In the case where the learning is carried out according to the steps of defining the combinations, selecting the combination or combinations, and determining the identification condition, the pixel values in the local characteristic quantity image or images of the type in at least one of the combinations may be values of a local characteristic quantity indicating probability of a pixel corresponding to an area of a characteristic in a predetermined range. In this case, the method may further comprise the step of correcting the identification criterion set for the selected combination or for each of the selected combinations by adjusting the predetermined range so as to improve identification accuracy for the images comprising the sample image group in the case where the local characteristic quantity image or images of the type in the selected combination or combinations have values of the local characteristic quantity indicating the probability as pixel values thereof, between the steps of selecting and determining.

Furthermore, in the case where the learning is carried out according to the steps of defining the combinations, selecting the combination or combinations, and determining the conditions, the pixel values of the local characteristic quantity image or images of the type of at least one of the combinations may be values of a local characteristic quantity indicating probability of a pixel corresponding to an area having a combination of a plurality of characteristics. In this case, the combination of the characteristics may be a combination of two or more characteristics selected from a group comprising hue, saturation, lightness and texture.

The specific-scene image selection apparatus of the present invention may further comprise:

correct identification reception means for receiving specification of a correct scene represented by the target image if a result of the judgment was wrong; and additional learning means for updating the identification condition by learning the target image regarding which the specification of the correct scene was received.

A program of the present invention for selecting an image of a specific scene causes a computer to function as:

image input reception means for receiving input of a target image;

local characteristic quantity image generation means for generating a local characteristic quantity image or local characteristic quantity images from the target image;

representative characteristic quantity calculation means for calculating a representative characteristic quantity or representative characteristic quantities for the local characteristic quantity image or for each of the local characteristic quantity images by using a result of sum-of-product calculations obtained by shifting and/or changing distribution of a mask or masks, which are previously related to a type of the local characteristic quantity image or images, in the corresponding local characteristic quantity image; and selection means for making judgment as to whether or not the target image indicates the specific scene by comparing a value or values of the representative characteristic quantity or quantities with a identification condition that is previously related to a type of the representative characteristic quantity or quantities and indicates a relationship between a possible value or possible values of the representative characteristic quantity or quantities and likelihood of the specific scene. A recording medium of the present invention is a computer-readable recording medium storing such a program.

According to the apparatus, the program and the recording medium of the present invention for selecting an image of a specific scene, the representative characteristic quantity or quantities are found with reference to the result of sum-of-product calculations obtained by shifting the mask or masks in the form of weighted matrix or matrices in the local characteristic quantity image or images generated from the target image and/or changing distribution in the mask or masks. Therefore, even if a position or an area proportion of a photography target changes due to a difference in composition or the like, a trend of layout of a characteristic part corresponding to the specific scene can be reflected appropriately in the value or values of the representative characteristic quantity or quantities. Therefore, accurate classification can be carried out.

Furthermore, if specification of a desired scene can be received as the specific scene, classification of images of various scenes can be carried out by one general-purpose apparatus, the program, or the recording medium storing the program.

In addition, if the type of the local characteristic quantity image or images to be generated, the type of the mask or masks to be used, the type of the representative characteristic quantity or quantities to be calculated, and the identification condition are determined by learning the sample image group in advance, the local characteristic quantity image or images and the like of the most optimal type and quantity can be used according to the scene represented by the sample image group. Therefore, without wasteful calculations, the selection can be carried out with high accuracy.

If the learning regarding the specific scene comprises the steps of defining the combinations of the types of the local characteristic quantity image or images, the mask or masks, and the representative characteristic quantity or quantities, selecting one or more of the combinations by carrying out the trial selection for setting the identification criterion for each of the combinations, correcting the identification criterion set for each of the combinations by adjusting the predetermined range in order to improve the identification accuracy regarding the images included in the sample image group in the case where the pixels in the local characteristic quantity image or images of the type in the selected combination or combinations have the values of the local characteristic quantity indicating the probability of a pixel corresponding to an area having a characteristic in the predetermined range, and determining the identification condition with reference to the corrected identification criterion, the predetermined range for the local characteristic quantity used for classification can be optimized for each of the scenes. Therefore, more accurate selection can be carried out.

Furthermore, if the learning further comprises the step of receiving correct identification of the target image regarding which the judgment was wrong, and the step of additional learning, the accuracy of classification can be improved continuously according to the target image. In addition, for a specific scene that is frequently specified by a user, a result of the learning is enriched, which leads to higher accuracy of classification.

Note that the program of the present invention may be provided being recorded on a computer readable medium. Those who are skilled in the art would know that computer readable media are not limited to any specific type of device, and include, but are not limited to: CD's, RAM's ROM's, hard disks, magnetic tapes, and internet downloads, in which computer instructions can be stored and/or transmitted. Transmission of the computer instructions through a network or through wireless transmission means is also within the scope of this invention. Additionally, the computer instructions include, but are not limited to: source, object, and executable code, and can be in any language, including higher level languages, assembly language, and machine language.

Further, the present invention provides an image pickup device comprising:

an image pickup portion which obtains image data of a shot image;

a scene designation reception portion which receives designation of a desired specific scene;

a local characteristic quantity image generation portion for generating at least a local characteristic quantity image from said obtained image data;

a representative characteristic quantity calculation portion for calculating at least a representative characteristic quantity for the each local characteristic quantity image by using a result of sum-of-product calculations obtained by shifting and/or changing distribution of at least a mask in the corresponding local characteristic quantity image, wherein said each mask is previously related to a type of the local characteristic quantity image; and an identification portion for making judgment as to whether said obtained image data indicates the specific scene by comparing at least a value of the representative characteristic quantity with a identification condition previously related to a type of the representative characteristic quantity, wherein said identification condition indicates a relationship between a possible value of the representative characteristic quantity and likelihood of the specific scene.

The image pickup devise may further comprises a scene specifying information obtaining portion which obtains information for specifying the scene upon shooting the image, wherein said scene designation reception portion receives designation of a desired specific scene with reference to the information for specifying the scene obtained by said scene specifying information obtaining portion.

Moreover, the present invention provides a specific scene image identification method comprising the steps of:

receiving input of a target image;

generating at least a local characteristic quantity image from said target image;

calculating at least a representative characteristic quantity for the each local characteristic quantity image by using a result of sum-of-product calculations obtained by shifting and/or changing distribution of at least a mask in the corresponding local characteristic quantity image, wherein said each mask is previously related to a type of the local characteristic quantity image; and making judgment as to whether the target image indicates the specific scene by comparing at least a value of the representative characteristic quantity with a identification condition previously related to a type of the representative characteristic quantity, wherein said identification condition indicates a relationship between a possible value of the representative characteristic quantity and likelihood of the specific scene.

According to the image pickup device of the present invention, it is possible to suitably process each image in accordance with the identified scene of the each shot image. Further, the image pickup devise may obtain information for identifying scene. Thereby, the identification accuracy is increased.

BRIEF DESCRIPTION OF THE DRAWINGS

FIG. 2 shows an example of reference data used by the apparatus in the first embodiment;

FIG. 4 is a table showing the types of local characteristic quantities that can be used as pixel values of local characteristic quantity images in the first embodiment;

FIGS. 6A to 6C show types of masks used in the first embodiment;

FIG. 12 is a view showing an example of the program executing environment-computing amount data used in the processing shown in FIG. 11;

FIG. 13 is a view showing an example of the characteristic value-computing amount data used in the processing shown in FIG. 11;

FIG. 14 is a view showing an example of the reference data used in a modification of the third embodiment;

FIG. 15 is a view showing an example of the limits of the calculation amount points employed in the high quality mode and the normal mode;

FIG. 16 is a view showing an example of the reference data for the high quality mode and that for the normal mode;

FIG. 27 is a flow chart for illustrating the flow of the processing which the image pickup device of the system in accordance with the eighth embodiment of the present invention executes.

DESCRIPTION OF THE PREFERRED EMBODIMENTS

Hereinafter, embodiments of the present invention will be described with reference to the accompanying drawings.

First Embodiment

Figure 1:
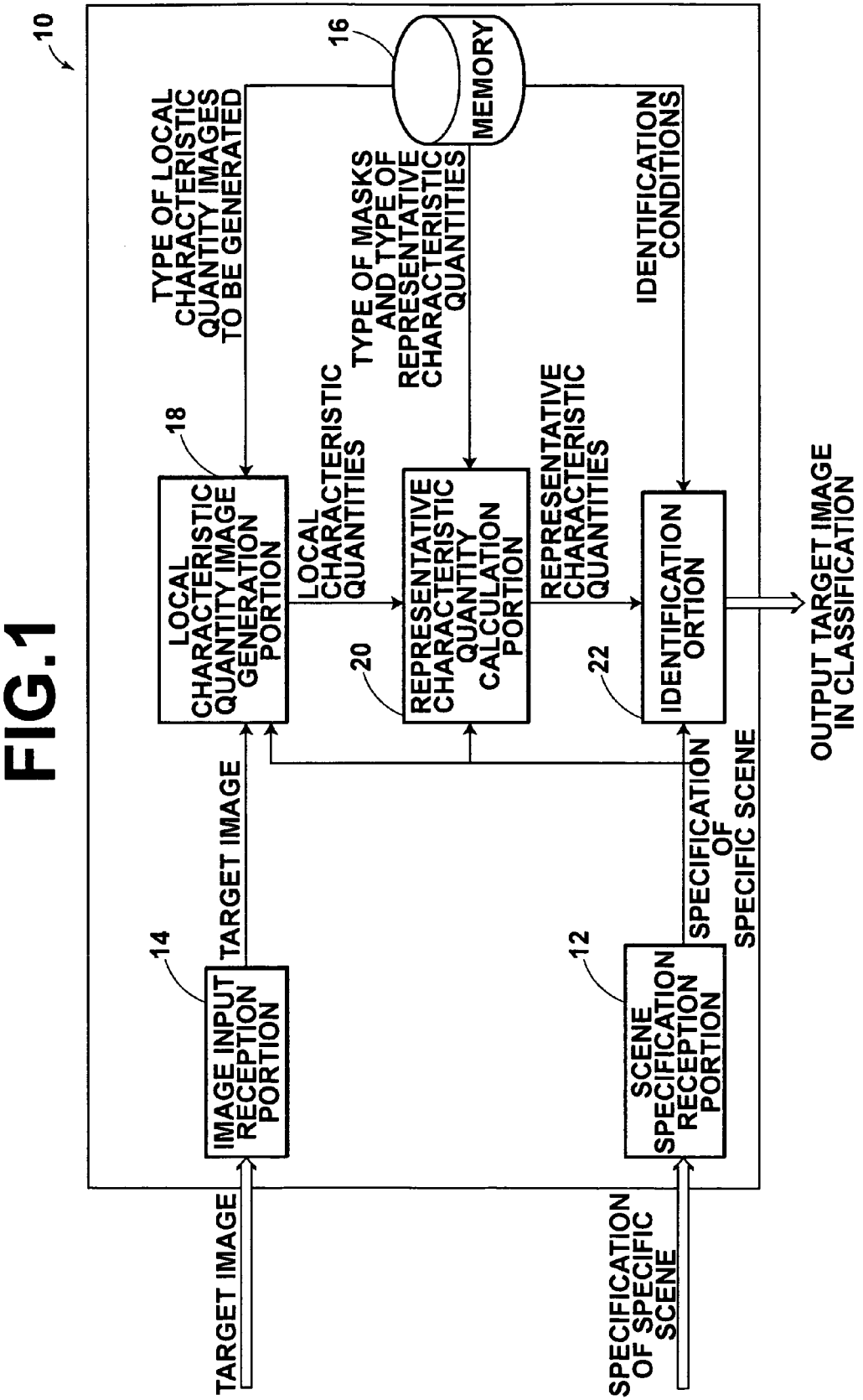
FIG. 1 is a block diagram showing the configuration of an apparatus of a first embodiment of the present invention for selecting an image of a specific scene.

FIG. 1 is a block diagram showing the configuration of an apparatus 10 of a first embodiment of the present invention for selecting an image of a specific scene. As shown in FIG. 1, the apparatus 10 comprises a scene specification reception portion 12 for receiving specification of a scene to be used for classification, an image input reception portion 14 for receiving a target image to be classified, a memory 16 for storing reference data that will be described later, a local characteristic quantity image generation portion 18 for generating a local characteristic quantity image or local characteristic quantity images (hereinafter referred to as the local characteristic quantity images) of a type specified by the reference data in the memory 16 according to the scene and the target image received from the scene specification reception portion 12 and the image input reception portion 14, a representative characteristic quantity calculation portion 20 for calculating a representative characteristic quantity or representative characteristic quantities (hereinafter referred to as the representative characteristic quantities) of a type specified by the reference data in the memory 16 from the local characteristic quantity images, and classification portion 22 for outputting the target image in classification by judging whether or not the target image is of the specified scene according to the representative characteristic quantities.

For each of scenes to be classified, the reference data stored in the memory 16 define the types of the local characteristic quantity images used for classification according to the scene, a type or types of a mask or masks (hereinafter referred to as the masks), the types of the representative characteristic quantities to be calculated by using the local characteristic quantity images and the masks, and identification conditions corresponding respectively to values of the representative characteristic quantities. For example, as shown in FIG. 2, the reference data takes the form of a reference table or the like. In the example in FIG. 2, only data for the scenes "night view" and "sunset" are shown for the sake of simpler explanation. However, the actual reference data comprises data for much more scenes. The types and combinations of the local characteristic quantity images, the masks, and the representative characteristic quantities vary, depending on the scenes. The identification conditions for the respective representative characteristic quantities are expressed as numerical sequences whose values are positive and negative.

Before describing a classification procedure carried out by the apparatus 10 and a learning procedure for generating the reference data shown in FIG. 2, the local characteristic quantity images and the masks used in this embodiment will be described first, with reference to FIGS. 3 to 6.

In this embodiment, the target image and sample images used for the learning are converted into images represented by Lab color specification system. Each of the images in the Lab color specification system is divided into 5 blocks, and a hue angle, saturation, lightness and a texture index are found for each of the blocks. In order to find the hue angle in each of the blocks, averages $a_{ave}$ and $b_{ave}$ of color differences $a(x,y)$ and $b(x,y)$ of pixels in the corresponding block are plotted in an ab plane, and an angle between the line connecting the plotted point and the origin and the a axis is found as the hue angle. The saturation for each of the blocks is found as the distance between the plotted point and the origin. The lightness in each of the blocks is found as an average $L_{ave}$ of lightness $L(x,y)$ of the pixels in the corresponding block. The texture index of each of the blocks is found as a standard deviation in the Lab space of the pixels in the corresponding block. In other words, the texture index is found according to the following equation:

$$T = \sqrt{\frac{1}{N} \sum_{x,y \in block} \{(L(x,y) - L_{ave})^2 + (a(x,y) - a_{ave})^2 + (b(x,y) - b_{ave})^2\}}$$

Equation 1 where N indicates the number of pixels in each of the blocks.

Figure 3A:
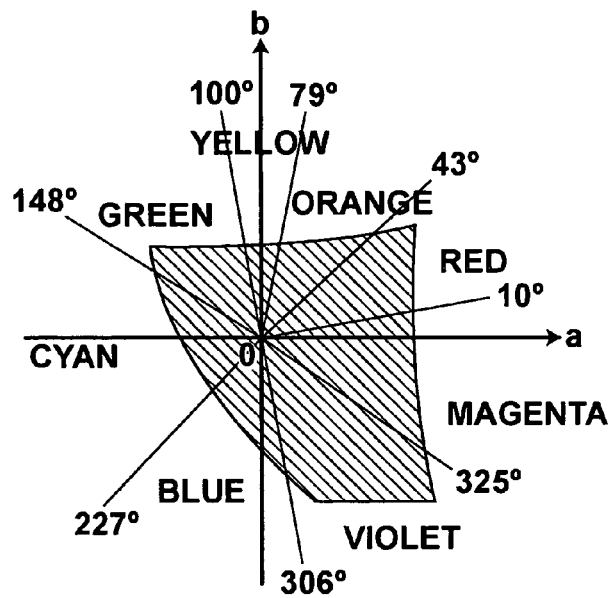
FIGS. 3A to 3D show image characteristics used in the first embodiment and division thereof.
Figure 3B:
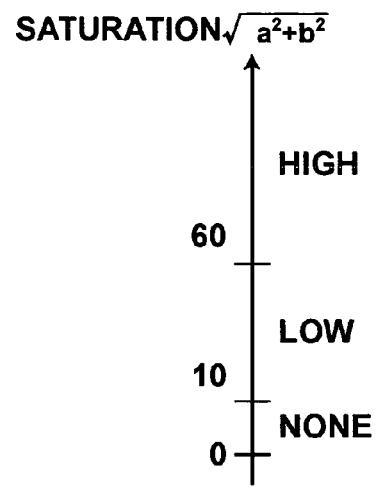
Figure 3C:
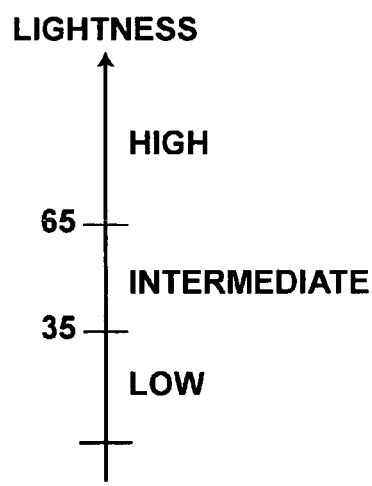
Figure 3D:
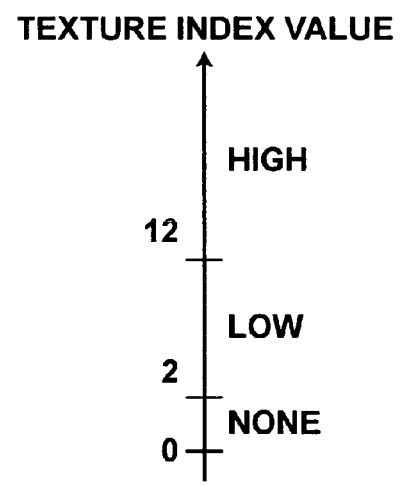

Generally speaking, a difference in the hue angle corresponds to a difference in hues, that is, in colors. In this embodiment, boundaries in the hue angle caused by the colors are defined as shown in FIG. 3A. For saturation, lightness and the texture index, boundaries for division into 3 ranges such as "none", "low" and "high" are respectively set, as shown in FIGS. 3B to 3D.

In this embodiment, 100 combinations from #0 to #99 in a table shown in FIG. 4 are defined between the ranges in the hue angle, saturation, lightness, and the texture index shown in FIGS. 3A to 3D. Therefore, 100 types of the local characteristic quantity images each having 5×5 pixels can be generated, and the local characteristic quantity images respectively have pixel values of local characteristic quantities indicating probability of blocks having the respective combinations of the characteristics in the ranges defined in the corresponding combinations. For example, in the table shown in FIG. 4, the pixel values in the local characteristic quantity image corresponding to a combination denoted by #83 in the table in FIG. 4 indicates the probability that each of the pixels therein is a pixel corresponding to a block wherein hue is red and saturation is high with complex texture regardless of lightness. The local characteristic quantities corresponding to the respective combinations #0~#99 take continuous values ranging from 0 to 1.

The local characteristic quantities indicating the probability of the respective combinations are values obtained by multiplying four index values indicating probability of the ranges of the hue angle, the saturation, the lightness and the texture index. The index values indicating the probability can take continuous values ranging from 0 to 1. For example, the pixel values in the local characteristic quantity image corresponding to the combination #83 can be calculated by multiplying the index values indicating the probability that hue is red in the block, the probability that saturation is high in the block, the probability that lightness is of any value in the block, and the probability that texture is complex in the block. The value of the index is 1 for indicating the probability that lightness is of any value in the block.

Figure 5A:
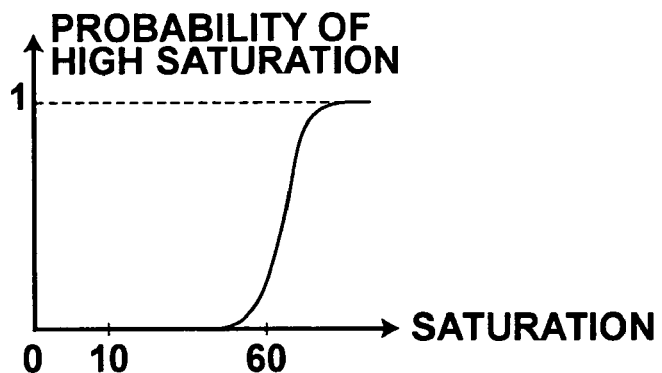
FIGS. 5A to 5C show probability of pixels corresponding to ranges of "none", "low", and "high" saturation.
Figure 5B:
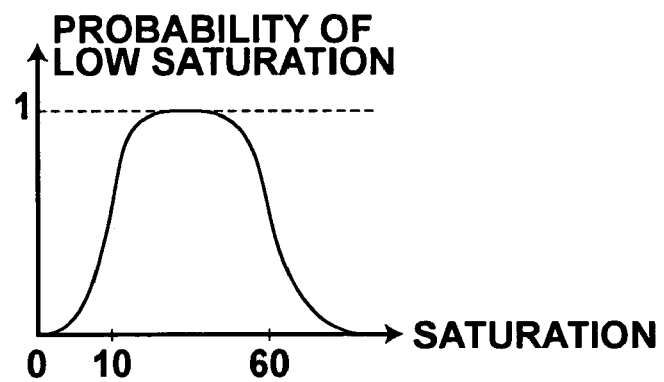
Figure 5C:
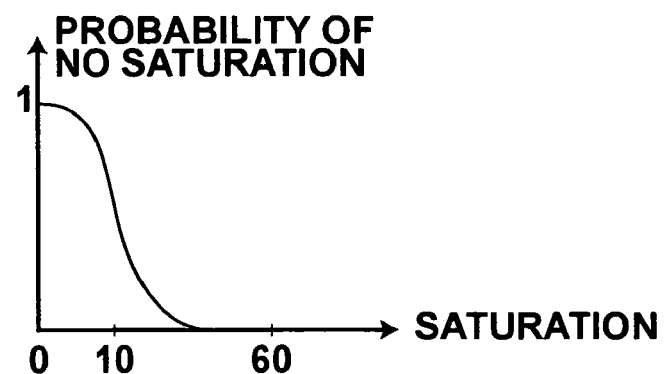

How the index values indicating the probability of each of the ranges can be calculated will be described below for the case of saturation. As shown in FIG. 3B, the value 60 is the boundary between "low" and "high" saturation. However, the saturation is not divided in a stepwise manner into high or low at the boundary. In reality, saturation changes gradually from high to low around the boundary. More specifically, if the saturation value indicating the corresponding block is represented by the horizontal axis, the index indicating the probability of high saturation changes as shown in FIG. 5A. The curve in FIG. 5A is a curve of a sigmoid function whose center of symmetry falls on the value 60, and the index is set to be 0.5 for the saturation value 60. Likewise, the index values indicating the probability of low or no saturation for the saturation value indicating the block are defined as shown in FIGS. 5B and 5C. For the hue angle, lightness, and the texture index, the index values indicating the probability are defined by similar curves of sigmoid functions whose center of symmetry is found at the boundary values.

As has been described above, the 100 types of the local characteristic quantity images of 5×5 pixels can be generated from the target image and from each of the sample images in this embodiment, and the pixel values therein represent the probability of each of the combinations. The representative characteristic quantities used for classification and learning are calculated as maximum values, minimum values, differences between the maximum and minimum values, or medians in a result of sum-of-product calculations obtained by shifting the predetermined masks or changing distribution in the masks in the local characteristic quantity images.

FIG. 6 shows the types of the masks that can be used in this embodiment. The masks are classified into "Uniform" masks, "Inclination" masks, and "Peak-shape" masks, all of which have various kinds of masks of different sizes.

The Uniform masks are masks wherein matrix values are constant, as shown by a mask 30 in FIG. 6A. The size of the local characteristic quantity images is 5×5 pixels, while the size of the Uniform masks ranges from 1×1 to 4×4 pixels. By scanning the local characteristic quantity images with each of the Uniform masks, an average of the local characteristic quantities at the position of each of the pixels in each of the local characteristic quantity images and its surroundings can be obtained as the result of sum-of-product calculations. The Uniform masks are effective for finding how a characteristic part corresponding to each of the scenes, such as light in night view, is distributed (concentrated or spread, for example). More specifically, in the case where the characteristic part is spread uniformly in the target image or in each of the sample images from which the local characteristic quantity images have been generated, a trend is observed that the result of sum-of-product calculations obtained by shifting the Uniform mask takes similar values. In the case where the characteristic part exists locally, the difference between the maximum and minimum values in the result of sum-of-product calculations tends to become great.

The Inclination masks are masks having matrix values decreasing monotonically from an upper row to a lower row. The size of the Inclination masks varies from 5×1 to 5×5 while the size of the local characteristic quantity images is 5×5. Each of the Inclination masks is subjected to the distribution change by matrix values shown by reference numerals 32, 34 and 36 in FIG. 6B upon application to the local characteristic quantity images. When the Inclination masks wherein the number of columns (hereinafter referred to as "width") is 1 to 4 are applied to the local characteristic quantity images whose width is larger than that of the masks, the distribution change is carried out at the same time as shifting. Therefore, the representative characteristic quantities are calculated as maximum values, minimum values, and differences between the maximum values and the minimum values or medians of the result of sum-of-product calculations obtained for each combination of the position change and the distribution change of the Inclination masks, for example. In the case where the Inclination mask whose size is 5×5 is applied to the local characteristic quantity images which also have the same size, only distribution change in the masks is carried out. The representative characteristic quantities are calculated as the maximum values, the minimum values, the differences between the maximum values and the minimum values, or the medians of the result of sum-of-product calculations in each distribution change. These Inclination masks are effective for finding how a characteristic part spreads toward one direction. For example, these Inclination masks are effective for finding how the sky in sunset is distributed to the upper side of an image. More specifically, in the case where the characteristic part is located close to one side of the target image or each of the sample images from which the local characteristic quantity images have been generated, a trend, such as increasing maximum values in the result of the sum-of-product calculations, is observed by shifting the masks and/or the distribution change of the masks. In the case where the characteristic part spreads uniformly, a trend, such as decreasing differences between the maximum values and the minimum values in the result of the sum-of-product calculations, is observed. For the case of sunset scene, the characteristic in layout, that is, the fact that the sunset sky is laid out in the upper side of an image, is extracted by shifting the masks even if the boundary between the sky and a distant view (such as the skyline) is partially cut by a near view. By carrying out the distribution change in the masks as shown in FIG. 6B, the characteristic that the sunset sky is positioned near the upper side can be extracted optimally even if an area proportion changes between the sky and another part due to a difference in composition or the like. In order to appropriately calculate the representative characteristic quantities indicating how the characteristic part is located near one side even in the case where the target image or the sample images are provided upside down, the direction of the Inclination masks may be changed in 4 directions when the masks are shifted and/or subjected to the distribution change.

The Peak-shape masks are masks having matrix values that are smaller in upper and lower rows but larger in a row therebetween. The size of the Peak-shape masks varies from 5×1 to 5×5 while the size of the local characteristic quantity images is 5×5. Each of the Peak-shape masks are subjected to distribution change by matrix values shown by reference numerals 38, 40 and 42 in FIG. 6C upon application thereof to the local characteristic quantity images. When the Peak-shape masks whose width is 1 to 4, that is, the Peak-shape masks whose width is smaller than the characteristic quantity images, are applied to the local characteristic quantity images, shifting and distribution change of the masks are carried out, and the representative characteristic quantities are calculated as maximum values, minimum values, differences between the maximum values and the minimum values, or medians in the result of the sum-of-product calculations for each combination of the position and the distribution of the masks, for example. In the case where the Peak-shape masks whose size is 5×5 are applied to the local characteristic quantity images which also have the same size, only the distribution change in the masks is carried out, and the representative characteristic quantities are calculated as the maximum values, the minimum values, and the differences between the maximum values and the minimum values, or the medians in the result of sum-of-product calculations for each distribution. These Peak-shape masks are effective for finding how a characteristic part is positioned locally in the center or to the right and left sides. More specifically, in the case where the characteristic part is situated near the center of the target image or each of the sample images from which the local characteristic quantity images have been generated, a trend, such as increasing maximum values in the result of the sum-of-product calculations, is observed by shifting the masks and/or distribution change of the masks. In the case where the characteristic part is distributed near the right and left sides, a trend, such as decreasing minimum values in the result of the sum-of-product calculations, is observed. Even in the case where a characteristic part is cut partially by a near view, the characteristic in layout, that is, the characteristic part is located at the center or the right and left sides, is extracted by shifting the masks. By carrying out distribution change in the masks as shown in FIG. 6C, the characteristic part being positioned near the center can be extracted even if the position of the part changes slightly due to a difference in composition. In order to appropriately calculate the representative characteristic quantities indicating how the characteristic part is located at the center or the right and left sides even in the case where the target image or the sample images are provided upside down, the direction of the Peak-shape masks may be changed in 4 directions while shifting and/or distribution change are also carried out.

The local characteristic quantity images and the masks used in this embodiment have been described above. With reference to a flow chart shown in FIG. 7, how the sample images are learned for each of the scenes will be described in advance for generating the reference data shown in FIG. 2.

In the learning procedure regarding the scene of night view, for example, the sample image group for the learning includes images of night view and images of scenes other than night view. A weight is assigned to each of the sample images. The weight, that is, importance, is initially set to be equal for all the sample images at Step S2 in the flow chart in FIG. 7.

At Step S4, the combinations are defined between the types of the local characteristic quantity images, the types of the masks, and the types of the representative characteristic quantities. The characteristic quantity images usable in this embodiment have the 100 types corresponding to #0 to #99 shown in FIG. 4, and each of the local characteristic quantity images has 5×5 pixels whose values represent the probability of the corresponding combination. The masks used in this embodiment have 14 types comprising the 4 types of Uniform masks, the 5 types of Inclination masks, and the 5 types of Peak-shape masks shown in FIGS. 6A to 6C. The representative characteristic quantities that can be used in this embodiment have the 4 types comprising the maximum values, the minimum values, the differences between the maximum and minimum values, and the medians in the result of sum-of-product calculations obtained by shifting the masks and changing distribution in the masks. Therefore, at Step S4, all the combinations of the types described above, that is, 100× 14×4=5600 combinations, are defined.

Figure 8:
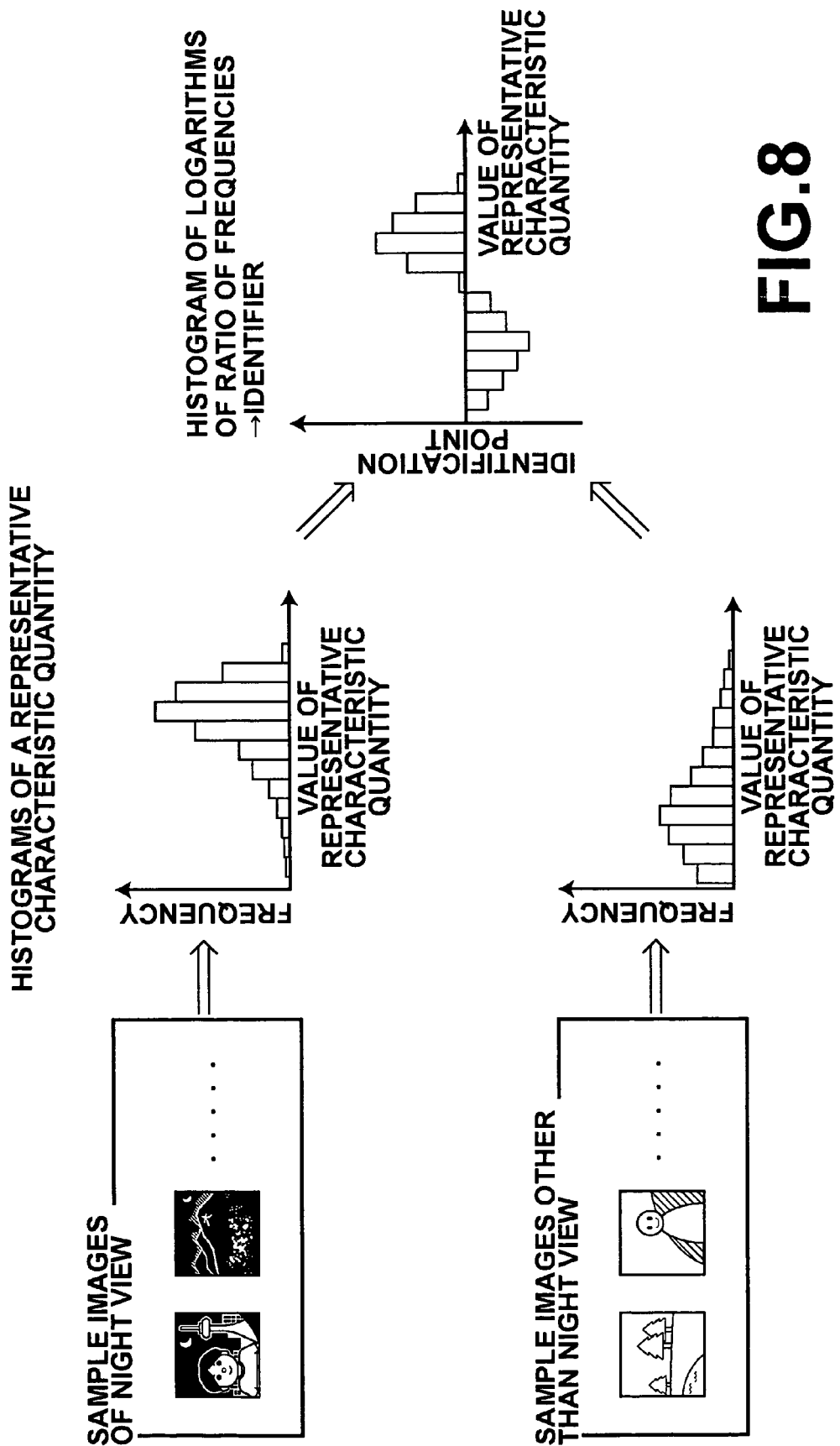
FIG. 8 shows how identifiers used as bases for confirming identification conditions shown in FIG. 2 are found.

At Step S6, identifiers are generated for each of the combinations usable in this embodiment, in order to provide the identification criteria for judging whether each of the images is a night view image. In the example shown in FIG. 8, histograms are used as the identifiers. The representative characteristic quantities of the type defined by each of the combinations are calculated first from the local characteristic quantity images and the masks of the corresponding type. In the example in FIG. 8, the local characteristic quantity images of the type specified by one of the combinations are generated from the night-view sample images, and the representative characteristic quantities of the type specified by the combination are calculated by using the mask of the type specified by the combination. The histogram shown in the upper part of FIG. 8 is generated regarding distribution of the values of the representative characteristic quantities at predetermined intervals. Likewise, the local characteristic quantity images of the type specified by the combination are also calculated from the sample images that do not represent night view, and the histogram shown in the lower part of FIG. 8 is generated. Logarithms of a ratio of frequencies in the two histograms are calculated and shown in the form of a histogram in the right of FIG. 8, and this histogram is used as one of the identifiers. Values of the vertical axis in the histogram as the identifier are hereinafter called "identification points". According to this identifier, an image whose representative characteristic quantities have values corresponding to the identification points of positive value is highly likely to be an image of night view, and the probability becomes higher as the absolute value of the identification points becomes larger. On the contrary, an image whose representative characteristic quantities values correspond to the identification points of negative value is highly likely to be an image of a scene other than night view, and the probability becomes higher as the absolute value of the identification points becomes larger. At Step S6, the identifiers in the form of the histograms are generated for all the 5600 combinations usable for classification.

At Step S8, one of the identifiers generated at Step S6 is selected as the most effective identifier, for judging whether each of the images in the sample image group is an image of night view. This selection is carried out in consideration of the weight of each of the sample images. In the example in FIG. 8, a weighted correct identification rate for each of the identifiers is examined and the identifier whose weighted correct identification rate is the highest is selected as the most effective identifier. More specifically, since the weight of each of the sample images is equal at initial Step S8, one of the identifiers is selected as the most effective identifier if the identifier has the largest number of the sample images that have been recognized correctly as the night view images or the images other than night view, in the case where the sample images whose representative characteristic quantities have the values corresponding to the positive identification points are judged to be the images of night view while the sample images whose representative characteristic quantities have the values corresponding to the negative identification points are judged to be the images other than night view. Meanwhile, at Step S8 carried out second time or later after Step S14 at which the weight is updated as will be described later, if the weight for one of the sample images (hereinafter called sample image A) is twice as large as that of another one of the sample images (called sample image B), the sample image A is equivalent to two sample images B in evaluation of the correct identification rate. In this manner, correct identification of the sample images whose weight is higher is more emphasized than the sample images whose weight is lower, at Step S8 carried out second time or later.

At Step S10, whether or not the rate of correct identification for a combination of the identifiers that have already been selected exceeds a predetermined threshold value is judged. In other words, whether a result of agreement between an actual result and a result of judgment made by using the combination of the identifiers that have already been selected exceeds a predetermined threshold value is examined, regarding the judgment as to whether each of the sample images is an image of night view or another scene. Probability of correct judgment is used as the rate of correct identification, in the case where a sum of the identification points shown by the identifiers that have been selected is found for each of the sample images and the corresponding sample image is judged to be an image of night view if the sum is positive. Otherwise, the image is judged to be an image of another scene. For the evaluation of the correct identification rate, either the weighted sample images or the sample images whose weight is equal may be used. In the case where the correct identification rate exceeds the predetermined threshold value, the identifiers that have been selected are sufficient for identification of the images of night view with high probability. Therefore, the learning ends. In the case where the correct identification rate does not exceed the predetermined threshold value, the procedure goes to Step S12 in FIG. 7 for selecting another one of the identifiers to be combined with the identifiers that have been selected.

At Step S12, in order not to select the identifier that has been selected at Step S8 immediately before Step S12, the combinations of the type of the local characteristic quantity images, the type of the masks, and the type of the representative characteristic quantities corresponding to the identifier are excluded.

At Step S14, the weight for each of the sample images that have not been recognized correctly by the combination including the identifier selected at Step S8 immediately before Step S14 is updated to become larger while the weight for each of the sample images that have been recognized correctly is updated to become smaller. This update is carried out to emphasize the sample images regarding which the identification was not correct by the combination of the identifiers that have been selected so that the identifier that can correctly recognize these images can be selected in the selection of another one of the identifiers. In this manner, an effect of combining the identifiers can be improved. Since the weight for each of the sample images whose identification was correct needs to be different from that for the remaining images, the weight may be either increased or reduced.

Figure 7:
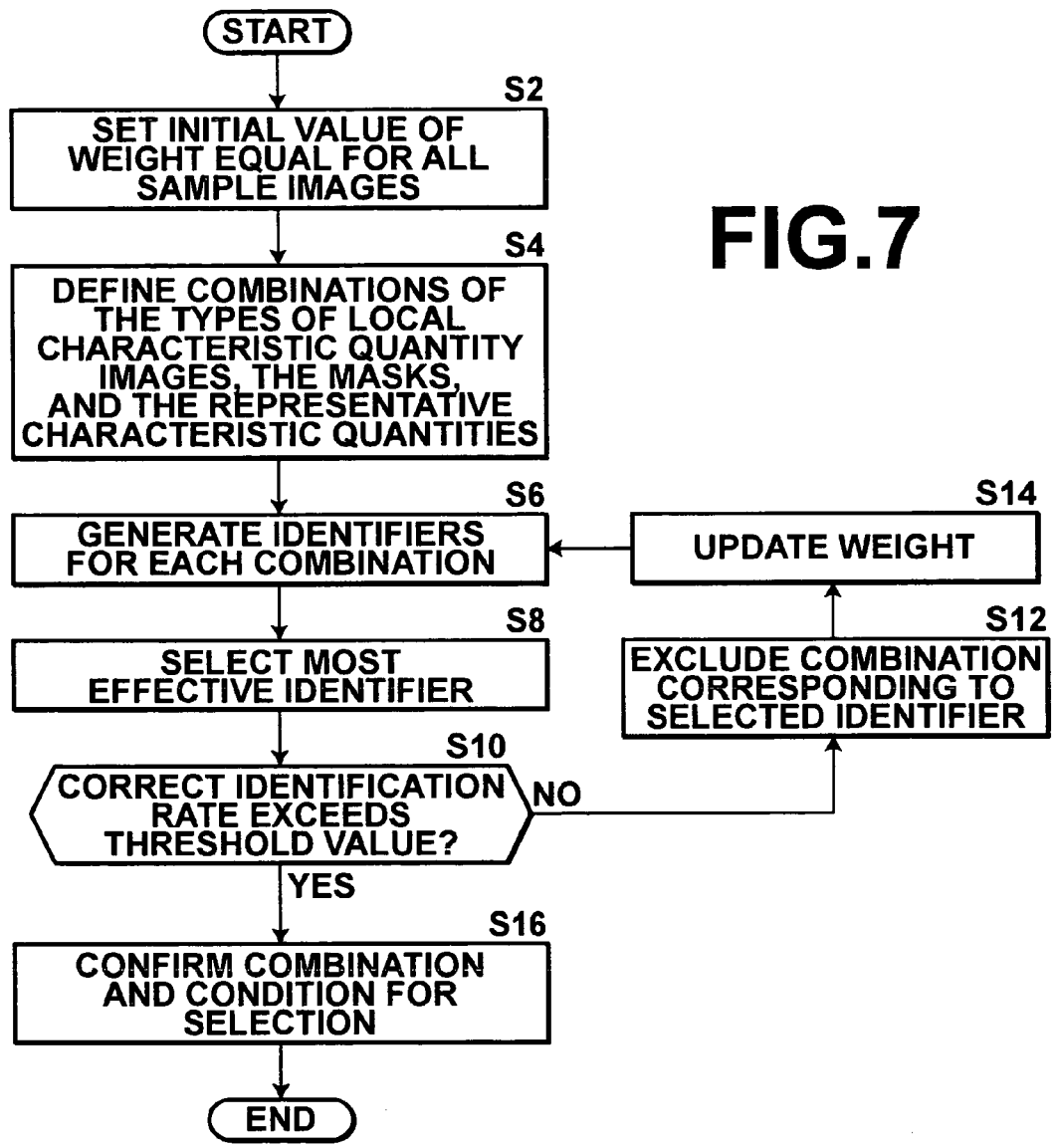
FIG. 7 is a flow chart showing a procedure in a learning method for defining the reference data shown in FIG. 2.

The procedure then returns to Step S6 in FIG. 7, and the identifiers are generated again for the combinations excluding the combinations selected at Step S12. The identifiers at Step S6 carried out second time or later are generated in consideration of the weight of each of the sample images. For example, if the weight for the sample image A is twice as large as that of the sample image B, the sample image A doubles the frequency of the sample image B in generation of the histograms in the middle of FIG. 8. In order to reduce an amount of calculations, new identifiers may be generated by updating the identifiers generated at Step S6. Thereafter, one of the identifiers that is second in the effectiveness to the identifiers that have been selected is selected at Step S8.

By repeating the procedure from Step S6 to Step S14, assume that the correct identification rate for the combination exceeds the threshold value at Step S10 after selecting (1) the identifier generated from the differences between the maximum and minimum values in the result of the sum-of-product calculations obtained by shifting the Uniform mask of 2×2 size in the local characteristic quantity images of 5×5 size whose pixel values represent the probability of the combination #41 in FIG. 4, (2) the identifier generated from the maximum values in the result of the sum-of-product calculations obtained by shifting the Uniform mask of 3×3 size in the local characteristic quantity images of 5×5 size whose pixel values represent the probability of the combination #49 in FIG. 4, and (3) the identifier generated from the maximum values in the result of the sum-of-product calculations obtained by shifting and distribution change of the Peak-shape mask whose width is 3 in the local characteristic quantity images of 5×5 size whose pixel values represent the probability of the combination #43 in FIG. 4 as the identifiers used for identification of night view images. The types of the local characteristic quantity images, the mask, and the representative characteristic quantities and the identification conditions are confirmed as shown in the first to third rows in the reference data shown in FIG. 2 for recognizing the scene of night view. The identification conditions in the form of numerical sequences serially describe the identification points shown by the selected identifiers in order of smaller values of the corresponding representative characteristic quantities.

In the method described with use of FIG. 7, in order to improve identification accuracy regarding the sample images, a step may be added between Steps S8 and S10 for correcting the identifier selected at Step S8 by adjusting a range of the probability of the predetermined combination expressed by the pixel values of the local characteristic quantity images from which the identifier has been generated. In the case where the identifier generated from the local characteristic quantity images of 5×5 pixels whose values represent the probability of the combination #41 has been selected at Step S8, this correction may be carried out by changing within a predetermined range the boundary between "none" and "low" for saturation, the boundary between "low" and "intermediate" for lightness, and the boundary between "none" and "low" for the texture index shown in FIG. 3. The identifier is regenerated for the combination of the changed boundaries, and the identifier corresponding to the combination of the boundaries showing the highest identification accuracy is finally selected as the identifier to be combined, for example. By adding this step, the range corresponding to the local characteristic quantities to be used for classification can be optimized for each of the scenes, which leads to higher accuracy of classification.

In the case where the learning method described above is used, the identifiers can be any identifiers as long as the identifiers can provide the identification criteria for judging an image of a specific scene and an image of another scene by using the representative characteristic quantities. For example, binary data, threshold values, or functions maybe used instead of the histograms. In the case of histograms, a histogram generated from differences in distribution of the two histograms shown in the middle of FIG. 8 may be used instead of the histogram shown in the right of FIG. 8.

In the above-described example, the identifiers are regenerated in consideration of the weight for each of the sample images at Step S6 before selection of the identifier second in the effectiveness to the identifiers that have been selected. However, the procedure in FIG. 7 may return to Step S8 after Step S14 so that the identifiers generated initially can be used for serial selection of the effective identifiers with reference to the weighted correct identification rate. In the case as in FIG. 7 where the identifiers are regenerated in consideration of the weight for each of the images after the most effective identifier is selected, selection of the most effective identifier at Step S8 may be carried out with reference to a simple correct identification rate instead of the weighted correct identification rate. Alternatively, since a identifier is more appropriate for identification of night view images if the identifier has a larger sum of the absolute values of the identification points and the two histograms in the middle of FIG. 8 used for finding the ratio have clear distinction in distribution. Therefore, the identifier having the largest absolute value may be selected. In the case of regeneration of the identifiers, the identifiers become different if the weight for each of the sample images becomes different. Therefore, Step S12 for excluding the characteristic quantities corresponding to the selected identifier may be omitted.

For the selection of the most effective identifier, an appropriate evaluation function or the like may be used.

The procedure carried out by the apparatus 10 in the first embodiment of the present invention will be described with reference to a flow chart shown in FIG. 9.

Figure 9:
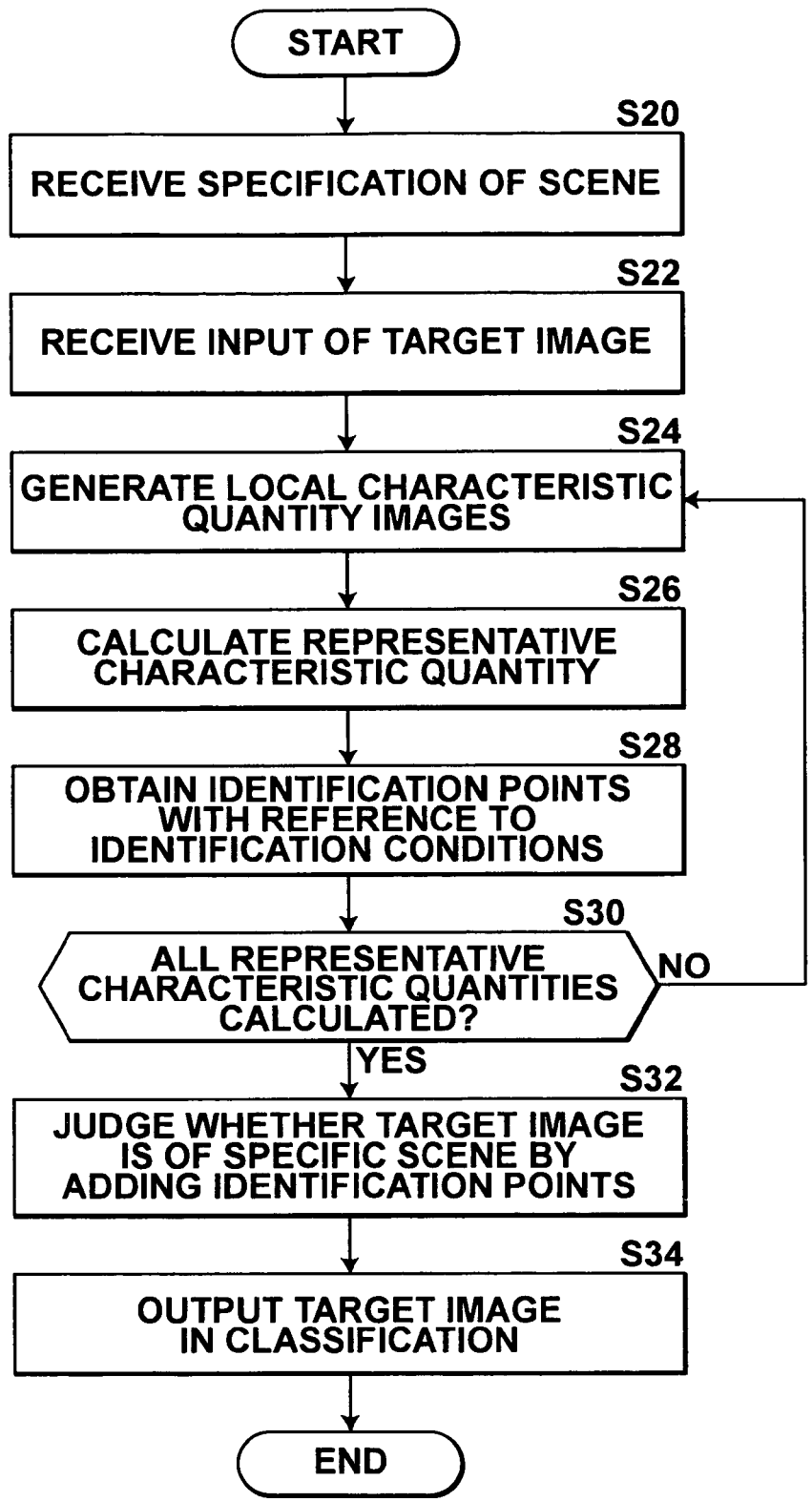
FIG. 9 is a flow chart showing a procedure of selection carried out by the apparatus shown in FIG. 1.

At Step S20 in FIG. 9, the scene reception portion 12 receives selection of a desired one of the scenes such as night view or sunset.

At Step S22, the image input reception portion 14 receives input of the target image. A plurality of target images may be received serially. The target image is received in the form of R, G, and B data of each of the pixels therein, for example.

At Step S24, the local characteristic quantity image generation portion 18 reads from the memory 16 one of the types of the local characteristic quantity images to be generated, and generates the local characteristic quantity images of the type from the target image that has been input. For example, if the scene specified at Step S20 is night view, the local characteristic quantity image generation portion 18 recognizes that the local characteristic quantity images to be generated are the local characteristic quantity images each having 5×5 pixels whose values represent the probability of the combination #41 in the table in FIG. 4, with reference to the reference data shown in FIG. 2 stored in the memory 16. The local characteristic quantity image generation portion 18 then generates the local characteristic quantity images from the target image.

At Step S26, the representative characteristic quantity calculation portion 20 receives the local characteristic quantity images from the local characteristic quantity image generation portion 18, and reads the type of the mask and the type of the representative characteristic quantity corresponding to the type of the local characteristic quantity images. The representative characteristic quantity calculation portion 20 then calculates the representative characteristic quantities of the type from the local characteristic quantity images. For example, if the local characteristic quantity images have been generated at Step S24 having the pixel values indicating the probability of the combination #41, the representative characteristic quantity calculation portion 20 scans the local characteristic quantity images with the 2×2 Uniform mask according to the reference data shown in FIG. 2 stored in the memory 16, and calculates at Step S26 the representative characteristic quantities as the differences between the maximum and minimum values in the result of the sum-of-product calculations obtained by shifting the mask.

At Step S28, the identification portion 22 obtains the identification points by referring to the identification conditions corresponding to the reference data in the memory 16, with reference to the respective representative characteristic quantities that have been calculated. For example, in the case where the differences between the maximum and minimum values are calculated as the representative characteristic quantities at Step S26, the identification portion 22 at Step S28 refers to a part of the identification conditions corresponding to the values of the representative characteristic quantities found at Step S26 in the first row in FIG. 2, and obtains the identification points. The identification conditions shown in FIG. 2 describe the identification points corresponding to the values of the representative characteristic quantities at the predetermined intervals. Therefore, the identification points obtained at Step S28 are the identification points of the values closest to the calculated values of the representative characteristic quantities or the identification points found by linear interpolation of the values.

At Step S30, whether all the representative characteristic quantities have been calculated is judged. In the case of night view, the representative characteristic quantities have the 3 types (that is, the types respectively corresponding to the combinations #41, 43, and 49) shown by the reference data in FIG. 2. Therefore, the procedure from Step S24 to Step S30 is repeated until the representative characteristic quantities of the 3 types have been calculated and the identification points corresponding to all the types have been obtained.

After acquisition of all the representative characteristic quantities and the corresponding identification points, the procedure goes to Step S32 in FIG. 9 whereat the identification portion 22 judges whether or not the target image is of the specified scene by considering all the identification points. In this embodiment, all the identification points are added up and whether the sum is of positive value or negative value is used for identification. For example, in the case of night view as the specific scene, if the sum of all the identification points generated from the 3 types of the representative characteristic quantities calculated from the target image is a positive value, the target image is judged to be an image of night view. In the case where the sum is negative, the target image is judged to be an image other than night view.

At Step S34, the identification portion 22 outputs the target image in classification, and the procedure in FIG. 9 ends.

In the embodiment described above, the reference data are stored in the memory 16 in the apparatus 10. However, the reference data may be stored in an apparatus other than the apparatus 10 or in a recording medium such as a CD-ROM as long as the local characteristic quantity image generation portion 18, the representative characteristic quantity calculation portion 20, and the identification portion 22 can access the reference data.

In this embodiment, the local characteristic quantities indicating the probability of the 100 combinations shown in FIG. 4 are used as the pixel values of the local characteristic quantity images. The local characteristic quantities represent the probability of the pixels corresponding to the respective areas of the characteristic quantity combinations. At the same time, the local characteristic quantities represent the probability of the pixels corresponding to the respective areas having the characteristics in the predetermined ranges. However, the local characteristic quantities used in the present invention are not necessarily limited to those described above. For example, the local characteristic quantities may be the hue angle, saturation, lightness, and the texture index of each of the pixels or in each of the blocks. In addition, although the local characteristic quantity images of 5×5 pixels are generated in the above-described embodiment, local characteristic quantity images of the same size as the target image may be generated.

The reference data used for classification are not necessarily limited to those shown in FIG. 2. For example, the identification conditions in FIG. 2 may be binary data or a threshold value or a function. The method adopted by the identification portion 22 is thus not necessarily limited to the sum of the identification points of positive or negative value. Furthermore, in the embodiment described above, the types of the local characteristic quantity images are defined in the reference data, for each of the scenes to be classified. However, reference data with no specification of the types of the local characteristic quantities may be used. In this case, the local characteristic quantity image generation portion 18 provides the target image input as data in the form of R, G, and B values as they are to the representative characteristic quantity calculation portion 20.

The method for predetermining the reference data is not necessarily limited to the method described with reference to FIGS. 7 and 8, and any other methods can be used. For example, a generally used machine learning method called clustering or boosting may be adopted. Alternatively, the reference data may be determined empirically by a skilled engineer.

The apparatus 10 in the first embodiment has the scene specification reception portion 12 so that classification of images of various scenes can be carried out. However, the apparatus 10 may be an apparatus for selecting an image of a specific scene, without the scene specification reception portion 12.

The apparatus 10 in the first embodiment calculates the representative characteristic quantities with reference to the result of sum-of-product calculations obtained by shifting and/or distribution change of the masks in the form of weighted matrices in the local characteristic quantity images. Therefore, even if a position or an area proportion of a photography target changes due to a difference in composition or the like, a trend in layout of a characteristic part corresponding to the desired one of the scenes can be reflected appropriately in the values of the representative characteristic quantities. Consequently, classification can be carried out with high accuracy.

Although the apparatus 10 of the first embodiment of the present invention has been described above, a program for causing a computer to function as means corresponding to the image input reception portion 14, the local characteristic quantity image generation portion 18, the representative characteristic quantity calculation portion 20, and the identification portion 22 for carrying out the procedure in FIG. 9 is an embodiment of the present invention. A computer-readable recording medium storing such a program is also an embodiment of the present invention. In these cases, the reference data may be included in the program or in the recording medium or provided from another apparatus or from another medium.

Second Embodiment

Figure 10:
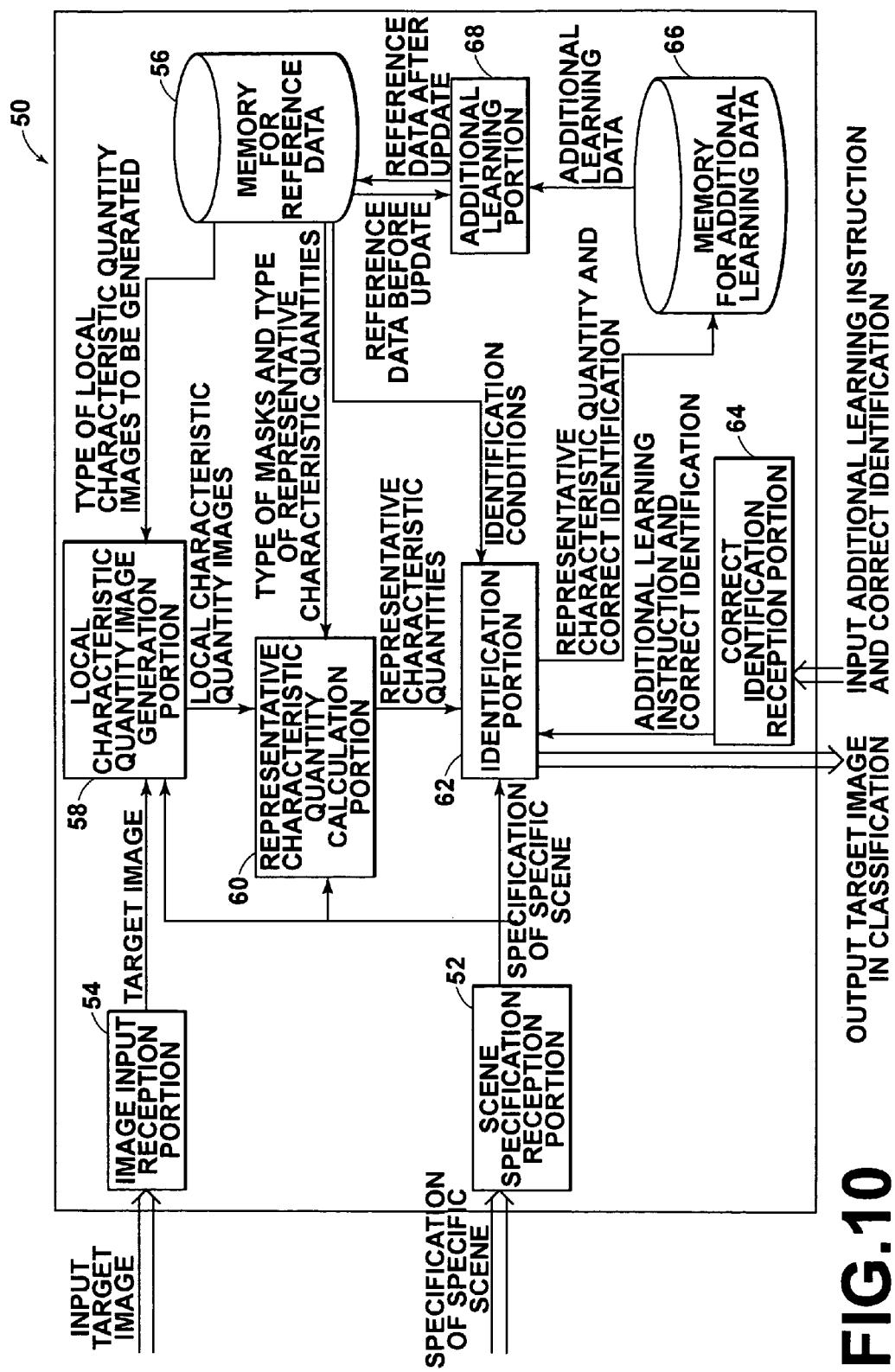
FIG. 10 is a block diagram showing the configuration of an apparatus in a second embodiment of the present invention for selecting an image of a specific scene.

An apparatus of a second embodiment of the present invention will be described next with reference to FIG. 10. FIG. 10 is a block diagram showing the configuration of an apparatus 50 of the second embodiment for selecting an image of a specific scene. Functions of a scene specification reception portion 52, an image input reception portion 54, a reference-data storing memory 56, a local characteristic quantity image generation portion 58, a representative characteristic quantity calculation portion 60, and a identification portion 62 are the same as the corresponding portions in the apparatus 10 of the first embodiment. A procedure carried out by these portions is the same as the procedure shown in FIG. 9. Therefore, description of these components is omitted, and only differences from the apparatus 10 of the first embodiment will be described below.

The apparatus 50 of the second embodiment has a correct identification reception portion 64, a memory 66 for storing additional learning data, and an additional learning portion 8. In other words, the apparatus 50 is different from the apparatus 10 in that the apparatus 50 has a self-learning function. If a user confirms an image by display or the like of the image after receiving a result of classification of the image from the identification portion 62, and finds the result is wrong, the user hopes for correct classification of an image similar to the image. The apparatus 50 meets such a demand.

More specifically, in the case where the user wishes the apparatus 50 to learn the result which was wrong, the user can instruct the correct identification reception portion 64 of the apparatus 50 to learn more by specifying the correct scene of the image. For example, in the case where an image having been judged by the identification portion 62 to be an image of night view is actually an image of sunset, the user specifies the correct identification "sunset" and gives the instruction. The correct identification reception portion 54 receives the instruction and the correct identification, and sends the instruction and the correct identification to the identification portion 62. Consequently, the identification portion 62 sends the representative characteristic quantities calculated by the representative characteristic quantity calculation portion 60 in the procedure of classification of the image whose classification was wrong and the correct identification to the memory 68 for storing additional learning data. Alternatively, instead of the correct identification and the calculated representative characteristic quantities, the correct identification and the image may be sent to the memory 68. The memory 68 also stores the sample images or the representative characteristic quantities thereof used for generating the reference data in the reference-data storing memory 56.

When an amount of data to be used for additional learning exceeds a predetermined amount in the memory 66 as the apparatus 50 is used repeatedly, the data stored in the memory 66 are sent to the additional learning portion 68 at which relearning and update of the reference data are carried out. In this embodiment, the additional learning portion 68 generates the reference data newly by using all the additional learning images whose correct identification has been specified and the sample images used for generating the initial reference data, according to the method in FIG. 7 or the like.

The method of learning by the additional learning portion 68 is not necessarily limited to the method described above, and any other methods can be used. For example, a generally used machine learning method called clustering or boosting may be adopted. Furthermore, only images whose correct identification has been specified may be learned additionally, without storing the sample images used for generation of the initial reference data and the representative characteristic quantities thereof in the memory 66. In this case, histograms as shown in FIG. 8 may be generated from the data of the images to be learned additionally, for the respective representative characteristic quantities and for the respective scenes. Averages are then calculated between the identification conditions shown by the histograms and the identification conditions represented by the reference data in the reference-data storing memory 56, and the reference data in the reference-data storing memory 56 are updated according to the averaged identification conditions as the new identification conditions. Furthermore, without the memory 66, the data of the images to be learned additionally may be sent directly from the identification portion 62 to the additional learning portion 68 for update of the reference data.

In the second embodiment, the additional learning and the update of the reference data are carried out when the amount of data to be learned additionally exceeds the predetermined amount. However, the additional learning and the update of the reference data may be carried out regularly or according to an instruction from the user.

According to the apparatus 50 of the second embodiment of the present invention, the same effects as in the first embodiment can be obtained. In addition, an effect of continuously improving classification accuracy according to the target image can also be obtained. Furthermore, for a scene frequently specified by the user, the content of the reference data are enriched, which realizes higher classification accuracy.

Although the apparatus 50 of the second embodiment of the present invention has been described above, a program for causing a computer to function as the image input reception portion 54, the local characteristic quantity image generation portion 58, the representative characteristic quantity calculation portion 60, the identification portion 62, the correct identification reception portion 64 and the additional learning portion 64 is also an embodiment of the present invention. A computer-readable recording medium storing such a program is also an embodiment of the present invention.

Third Embodiment

A computer program in accordance with a third embodiment of the present invention will be described with reference to FIGS. 11 to 14, below. The computer program in accordance with the third embodiment of the present invention is for causing a computer to execute the processing of selecting images of the specific scenes described above in conjunction with the preceding embodiments under an optimal load taking into account the program executing environment such as the performance of the CPU or the capacity of the memory.

Figure 11:
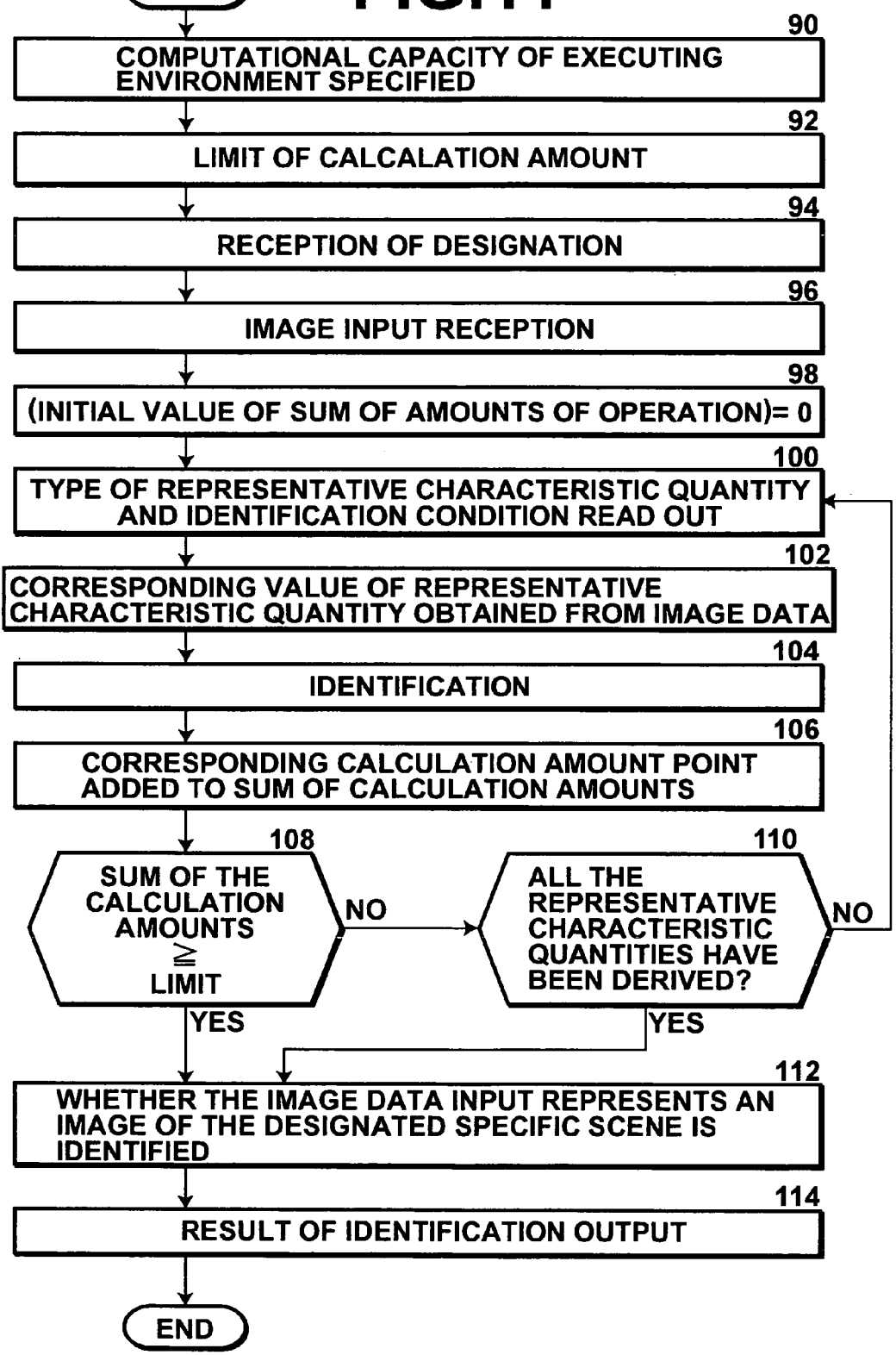
FIG. 11 is a view showing a flow chart illustrating the flow of processing which the computer program in accordance with a third embodiment of the present invention causes a computer to execute.

FIG. 11 is a flow chart illustrating the flow of processing which the computer program in accordance with a third embodiment of the present invention causes a computer to execute.

In step 90, the computing power of the executing environment is specified. In this embodiment, it is assumed that only the performance of the CPU of the computer to be used governs the computing power of the executing environment. In step 90, the type of the CPU of the computer may be automatically detected, or specified by requiring the user to designate the model No. of the computer to be used.

Then in step 92, limit of the amount of operation is set referring to the executing environment-calculation amount data in dependence upon the performance of the CPU of the computer specified instep 90. In this embodiment, the executing environment-operation amount data is data in the form of a lookup table where the limit of the amount of operation is defined by the performance of the CPU as shown in FIG. 12. In the example shown in FIG. 12, the limit of the calculation amount is set higher as the performance of the CPU increases. The executing environment-calculation amount data may be included in the program or may be provided from an external apparatus or a separate medium such as a CD-ROM.

In the following steps 94 and 96, designation of a specific scene desired and input of image data representing an image to be selected are received as in the processing shown in FIG. 9. The initial value of the sum of the amounts of operation is set to 0 in step 98.

In step 100, a set of the type of the representative characteristic quantity and the identification condition is read out from the reference data. The reference data is the same as the data shown in FIG. 2. For example, when the specific scene designated in step 94 is the night scene, the type of the local characteristic quantity image, the type of the mask, and the type of the representative characteristic quantity are defined and the corresponding identification condition is read out, in step 100. For example, referring to FIG. 2, #41 of 5×5 image (as the type of the local characteristic quantity image), 2×2 uniform mask (as the type of the mask), and "(Maximum)– (Minimum)" (as the type of the representative characteristic quantity) are defined, and then, the identification condition corresponding to the defined types is read out. The reference data may be included in the program or may be provided from a memory in the computer, an external apparatus or a separate medium.

Then in step 102, the value of the representative characteristic quantity corresponding to those read out from the preceding step 100 is calculated from the image data input in step 96. Here, the program in accordance with this embodiment defines calculation necessary to obtain at least all the characteristic values included in the reference data shown in FIG. 2.

In step 104, one identification point is obtained by referring the identification condition with the reference to the representative characteristic quantity calculated in step 102. The processing here may be effected in a procedure the same as step 60 in FIG. 9.

In step 106, a calculation amount point corresponding to the value of the representative characteristic quantity obtained in step 102 is added to the sum of the calculation amounts referring to a representative characteristic quantity-calculation amount data. In this embodiment, the representative characteristic quantity-calculation amount data is in the form of a lookup table where the calculation amount point is defined by the values of the representative characteristic quantity used in identification as shown in FIG. 13. A larger calculation amount point is given to the representative characteristic quantity in the data as the representative characteristic quantity is larger in number of calculations or number of iterations. The representative characteristic quantity-calculation amount data may be included in the program or may be provided from a memory in the computer, an external apparatus or a separate medium.

In step 108, it is determined whether the sum of the calculation amounts becomes not smaller than the limit of the amount of operation set in step 92. When it is determined that the sum of the calculation amounts is still smaller than the limit, it is further determined in step 110 that all the representative characteristic quantities defined by the reference data for the current specific scenes have been obtained. When it is determined in step 110 that all the representative characteristic quantities defined by the reference data for the current specific scenes have not been obtained yet, the processing shown in FIG. 11 returns to step 100. Thus, steps 100 to 110 are repeated until all the representative characteristic quantities defined by the reference data for the current specific scenes have been obtained.

When the sum of the calculation amounts becomes larger than the limit or all the representative characteristic quantities defined by the reference data for the current specific scenes have been obtained, the processing shown in FIG. 11 proceeds to step 112. In step 112, whether the input image data is of the designated specific scene is determined with reference to all the identification points. As in the first embodiment, the identification is effected by adding up all the values of the identification points.

Finally in step 114, the result of identification is output, and then the processing shown in FIG. 11 is ended.

Method carrying out the processing under an optimal load taking into account the program executing environment need not be limited to that described above. For example, reference data such as shown in FIG. 14 may be used in place of that such as shown in FIG. 2 without use of the executing environment-calculation amount data nor the representative characteristic quantity-calculation amount data. In the reference data shown in FIG. 14, data in the form of a lookup table similar to that shown in FIG. 2 is defined by the performance of the CPU. As the performance of the CPU becomes higher, the number of types of the representative characteristic quantity to be used in identification of each of the specific scenes is increased, and as the performance of the CPU becomes lower, the number of types of the representative characteristic quantity to be used in identification of each of the specific scenes is decreased, as can be understood from FIG. 14. In addition to or in place of this, representative characteristic quantities which requires a lot of calculation may be omitted in the lookup tables corresponding to the CPUs of the low performances. In the modification where reference data such as shown in FIG. 14, steps 92, 98, 106 and 108 shown in FIG. 11 become unnecessary. Further, in step 100, the lookup table corresponding to the performance of the CPU specified in step 90 is referred.

In the third embodiment and the modification thereof described above, only the performance of the CPU is taken into account as a factor which governs the computational capacity of the executing environment. However, in place thereof or in addition thereto, other factors such as the capacity of the memory and the like may be taken into account.

For example, in the image taking device such as a digital camera, a limit of the calculation amount point may be determined according to whether the shooting mode designated by the user is the high quality mode or the normal mode as shown in FIG. 15 and the calculation may be performed to the limit.

Otherwise, a pair of pieces of data in the form of lookup tables such as shown in FIG. 16 in which the identification condition is set versus the representative characteristic quantity may be prepared so that different data is read according to whether the shooting mode designated by the user is the high quality mode or the normal mode. The data may be set by the user so that processing desired by the user can be performed.

With the program in accordance with the third embodiment or the modification there of described above, in addition to effects similar to that obtained by the apparatus 10 of the first embodiment, a highest possible identification accuracy can be realized by an optimal load within the computational capacity of the system. Further, in the case where the computational capacity of the executing environment is designated by the user, the user may designate a small computational capacity depending on the desired calculation speed even if the executing environment actually has a larger computational capacity in order to increase the processing speed.

Further, a computer-readable medium on which a computer program in accordance with the third embodiment or the modification there of described above has been recorded is included in the present invention.

Fourth Embodiment

A fourth embodiment of the present invention will be described below. Though an apparatus for identifying an image of the night scene has been described in the first embodiment, a scene classifying apparatus which classifies the input image into the underwater scene, the night scene, the evening blow scene, and other scenes in a similar manner will be described in detail in this embodiment.

The scene classifying apparatus 11 (shown in FIG. 17) comprises an apparatus 10 which selects the input image of a specific scene and a classifying portion 25 which classifies the input image according to the result of identification by the apparatus 10. Since being substantially the same as that described in the first embodiment, the apparatus 10 will not be described in detail here but only the difference therebetween will be described, below.

Figure 17:
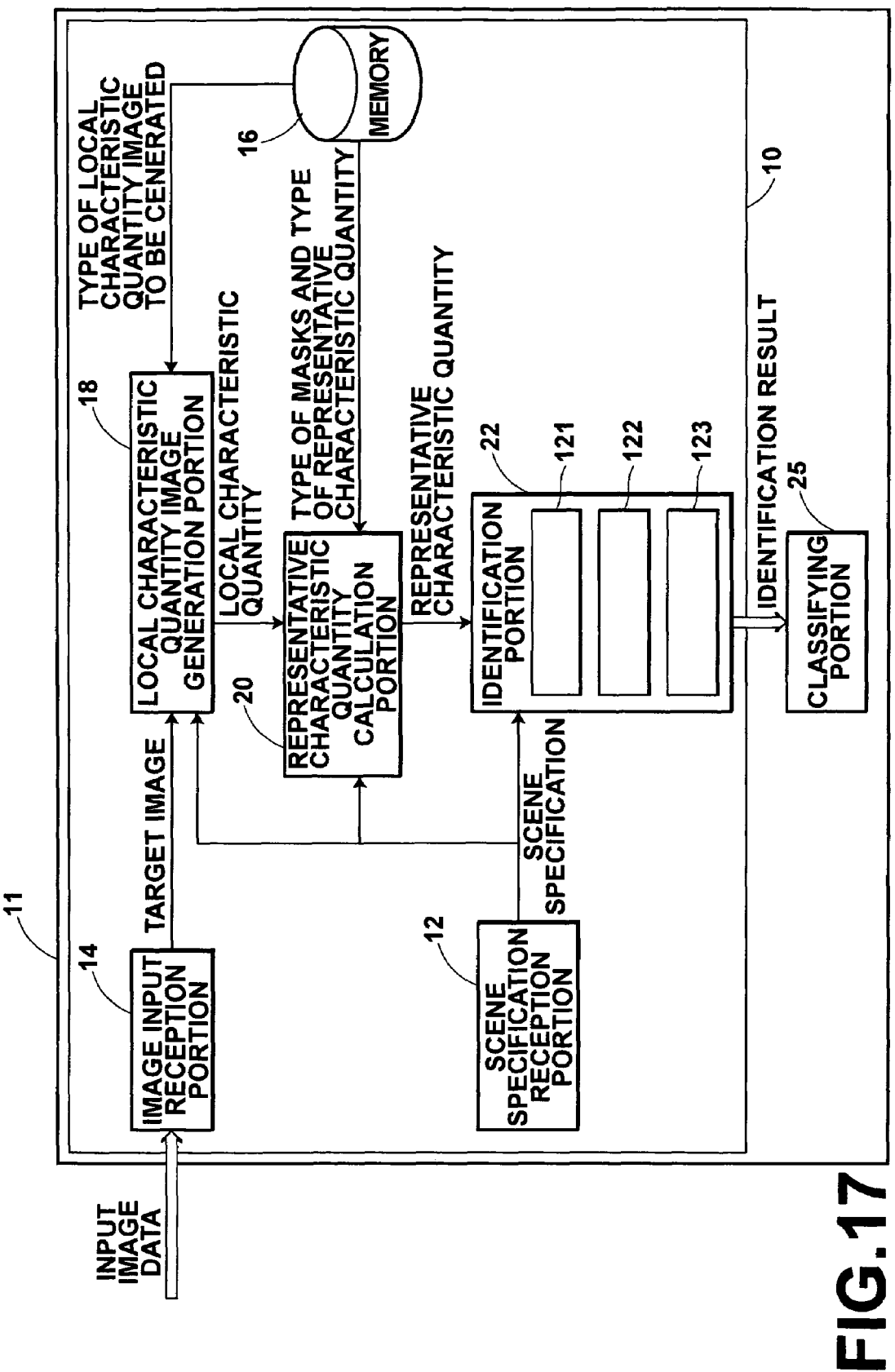
FIG. 17 is a block diagram showing the scene classifying device of the apparatus in accordance with a fourth embodiment of the present invention.

As shown in FIG. 17, the identification portion 22 is provided with an identifier group (a plurality of identifiers) 121 for identification of the underwater scene, an identifier group 122 for identification of the night scene and an identifier group 123 for identification of the sunset scene.

For example, when distinguishing the underwater scene, a plurality of identifiers (each corresponding to one characteristic quantity) are first prepared, and the characteristic quantities obtained from the sample images to be learned are input into the respective identifiers, and the most effective identifier is selected from the identifiers.

The weights on the sample images which the identifier has correctly identifies as of the underwater scene are lightened while the weights on the sample images which the identifier has not correctly identified as of the underwater scene are increased and the sample images are input into the remaining identifiers which have not been selected. Then, from among the identifiers, one or more identifiers which are higher in the rate of correct answer are further selected. The identifier is added by repeating these steps until the rate of correct answer exceeds a predetermined threshold value. (See FIG. 7.)

The identifier group 121 for identification of the underwater scene is thus selected as a result of the learning. The identification portion 22 identifies whether or not the input image data is of the underwater scene by the use of the identifier group 121. When the image data to be identified is input, whether or not the input image data is of the underwater scene is determined with reference to the identification points obtained by the respective identifiers. For example, though some representative characteristic quantities with respect to only the night scene and the sunset scene are shown in the FIG. 2, other values which correspond to the shown representative characteristic quantities and are related to the underwater scene are utilized in this procedure. In that case, the input image data is identified as an image of the underwater scene if the sum of the identification points derived from the input image data is positive. While, the input image data is identified as an image not of the underwater scene if the sum of the identification points derived from the input image data is negative.

As the night scene, the identifier which is most effective in identification of the night scene is selected from the identifiers according to the method shown in the flow chart of FIG. 7 by the use of image samples of the night scene, and then the identifier is added by repeating the steps until the rate of correct answer exceeds a predetermined threshold value. Thereby, the identifier group 122 for identification of the night scene is selected. Specifically, for example, three identifiers (each corresponding to one of the representative characteristic quantities of the night scene, shown in FIG. 2) are prepared. When identifying the night scene in the identification portion 22, the three identifiers selected as a result of the learning are used and the identification points obtained from the respective identifiers are summed.

Similarly, as the sunset scene, the identifier group 123 for identification of the sunset scene is selected. Specifically, for example, two identifiers (each corresponding to one of the characteristic quantities of the sunset scene, shown in FIG. 2) are prepared. When identifying the sunset scene in the identifying portion 22, the identifier group 123 selected as a result of the learning is used and the identification points obtained from the respective identifiers are summed.

Figure 18:
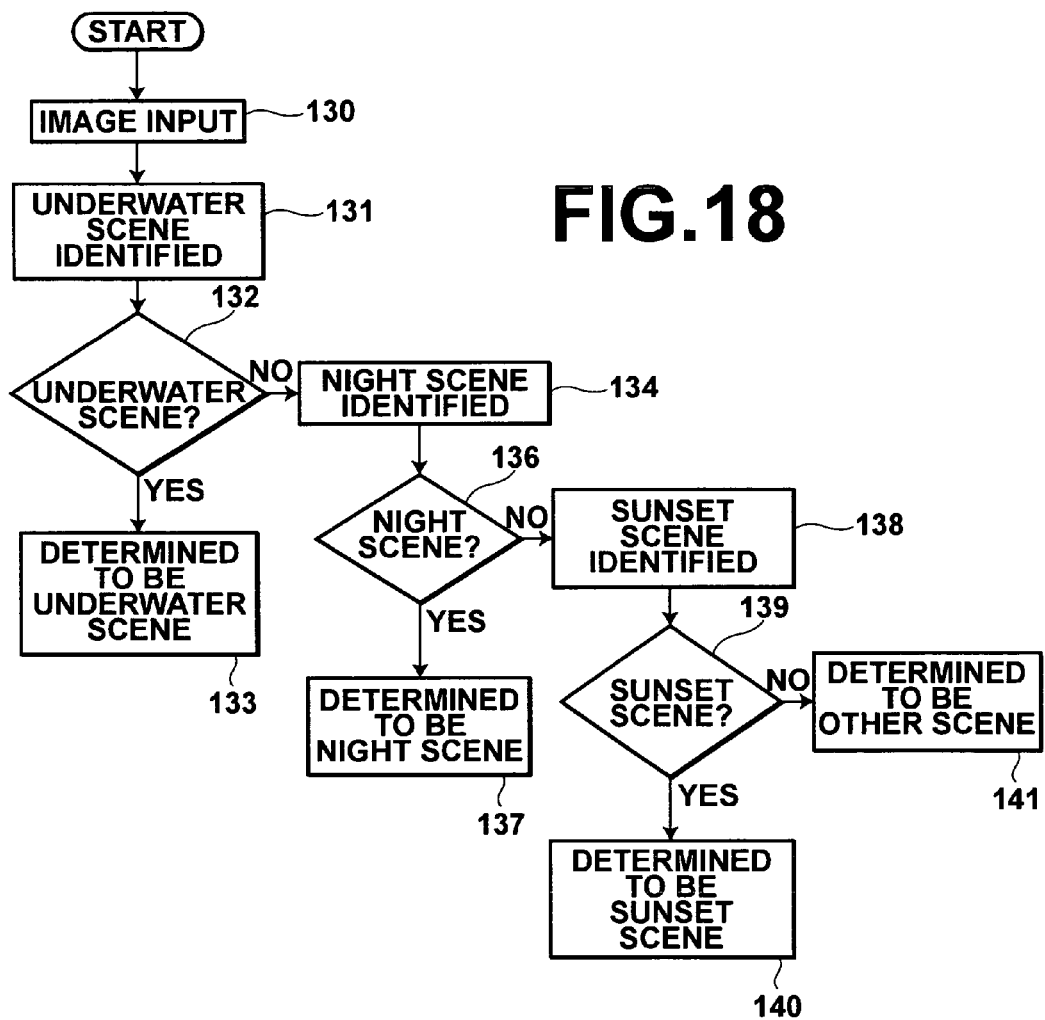
FIG. 18 is a flow chart for illustrating the flow of the processing which the program in accordance with the fourth embodiment of the present invention causes a computer to execute.

FIG. 18 is a flow chart indicating an example of the flow of processing when the classifying portion 25 classifies the input image into the underwater scene, the night scene, the sunset scene, and other scenes. The processing in each step will be described in detail, below.

An image is first input through the image input reception portion 14 (step 130). Then, in the step 131, representative characteristic quantities for identification of the underwater scene are calculated from the input image by using the local characteristic quantity image generation portion 18 and the representative characteristic quantity calculation portion 20, and identification points for identification of the underwater scene are obtained from the each identifier of the identifier group 121 (step 131). The identification points are summed, and whether or not the input image is of the underwater scene, is determined with reference to whether the sum is positive or negative.

When it is determined in step 132 that the sum is positive, the input image is identified as an image of the underwater scene in step 133. While, when it is determined in step 132 that the sum is negative, the processing proceeds to step 134. In step 134, it is determined whether or not the input image is of the night scene. That is, in step 134, the representative characteristic quantities (see FIG. 2) for identification of the night scene are calculated from the input image by the use of the local characteristic quantity image generation portion 18 and the representative characteristic quantity calculation portion 20, and the identification points are obtained from the respective identifiers in the identifier group 122 for identification of the night scene. The identification points are summed, and whether or not the input image is of the night scene is determined with reference to the sum.

When it is determined in step 136 that the sum is positive, it is determined in step 137 that the input image is of the night scene. While, when it is determined in step 136 that the sum is negative, the processing proceeds to step 138. In step 138, it is determined whether or not the input image is of the sunset scene. That is, in step 138, the representative characteristic quantities (see FIG. 2) for identification of the sunset scene are calculated from the input image by the use of the local characteristic quantity image generation portion 18 and the representative characteristic quantity calculation portion 20, and the identification points are obtained from the respective identifiers in the identifier group 123 for identification of the sunset scene. The identification points are summed, and whether or not the input image is of the night scene is determined with reference to the sum.

When it is determined in step 139 that the sum is positive, it is determined in step 140 that the input image is of the evening sunset scene. While, when it is determined in step 139 that the sum is negative, it is determined in step 141 that the input image is of the other scenes.

Though in the above embodiments, whether the input image is of the underwater scene, the night scene, or the sunset scene is determined in this order, it is preferred that whether the input image is of the underwater scene, the night scene or the evening sunset scene be determined from the scene which the preceding input image is determined to be of when the current input image and the preceding input image shot at a short interval since in such a case probability that the images are of the same scene is strong. For example, when the preceding one of the two images which were shot at a short interval is determined to be of the sunset scene, the probability that the next image is of the sunset scene is strong. Accordingly, in this case, by first carrying out the identification on whether the input image is of the sunset scene, the probability that the other identifications become unnecessary to increase the efficiency of the processing becomes strong.

Figure 19:
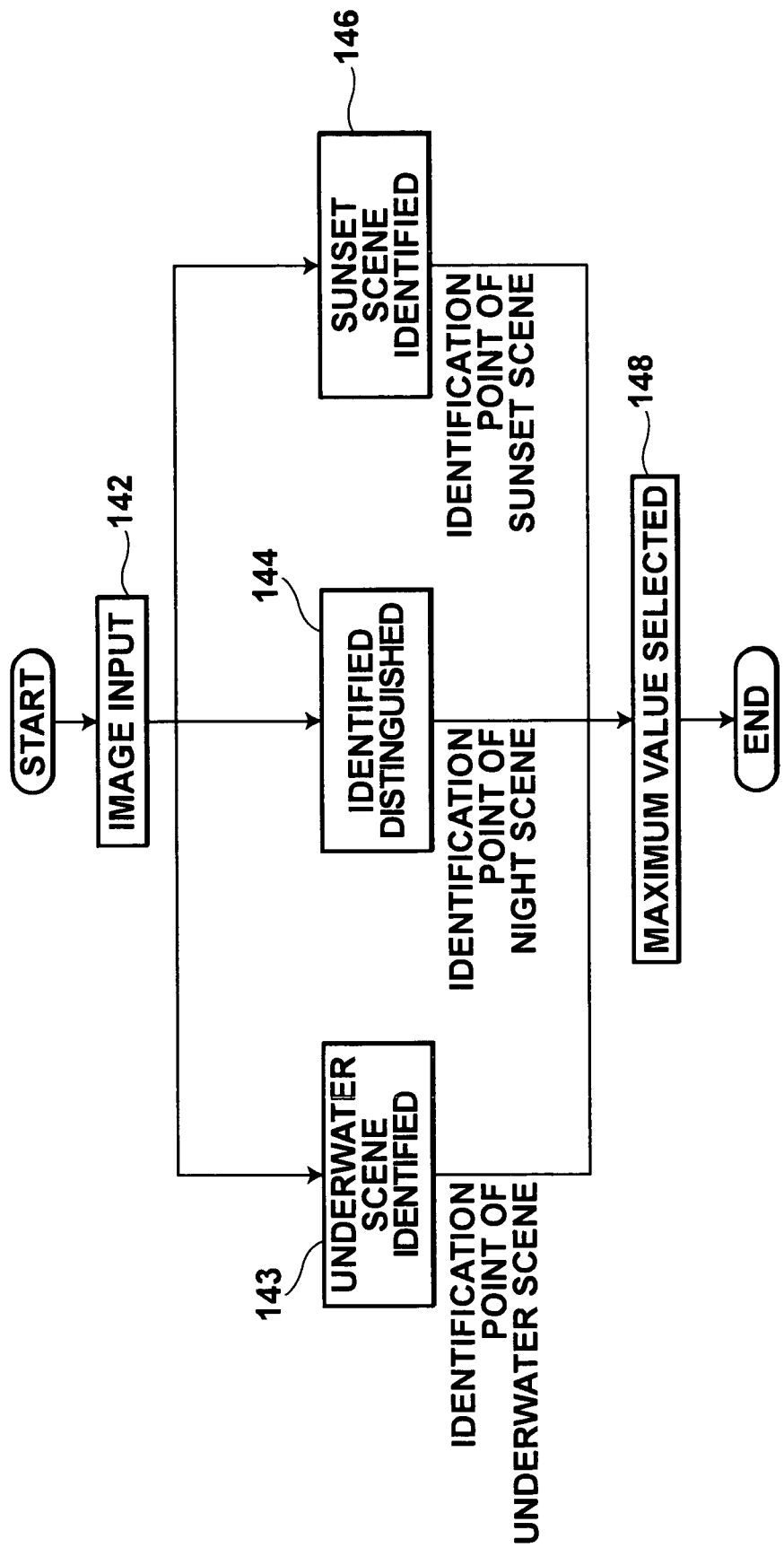
FIG. 19 is a view showing a modification the flow of the processing shown in FIG. 18.

Whether the input image is of the underwater scene, the night scene, or the sunset scene may be determined in parallel in the classifying portion 25 as shown in the flow chart shown in FIG. 19.

That is, an image is input in step 142, and the representative characteristic quantities calculated in the representative characteristic quantity calculation portion 20 are respectively input into the identifier groups 121, 122 and 123 in steps 143, 144 and 146. The input image is determined to be of the scene corresponding to the identifier group whose sum of the identification points are the largest in the three identifier groups 121, 122 and 123 in step 148. However, when the largest sum of the identification points is not larger than a predetermined threshold value, the input image is determined to be of the other scenes.

Though, being carried out by the method described in conjunction with first embodiment in this embodiment, the identification may be carried out by any method. For example, a common mechanical learning known under the name of "clustering" or "boosting" may be used. Further, the characteristic quantities need not be described above but may be those empirically determined by a skilled engineer.

Further, this embodiment may be added with an arrangement for additional learning such as shown in the second embodiment.

Fifth Embodiment

A fifth embodiment of the present invention will be described, below. In this embodiment, a system comprising an image pickup device such as a digital still camera or a cellular phone with a camera, and an output device such as a monitor, a printer or instruments installed in a laboratory (including a server in a photo-bank) will be described. In the following embodiments, the elements analogous to those described above are given the same reference numerals and will not be described in detail.

Figure 20:
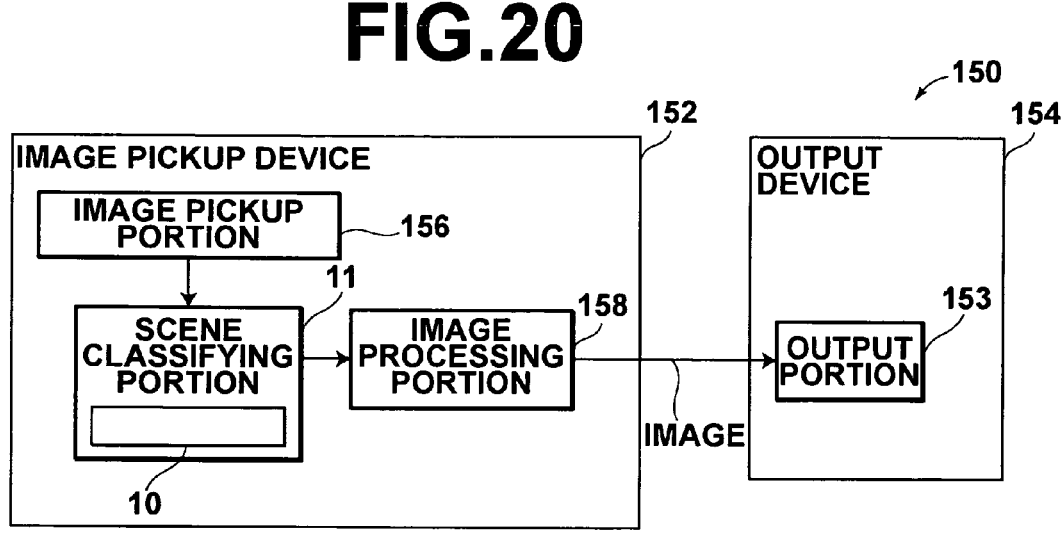
FIG. 20 is a block diagram showing the system in accordance with a fifth embodiment of the present invention.

As shown in FIG. 20, the system 150 of this embodiment comprises an image pickup device 152 and an output device 154. The image pickup device 152 is provided with an OS (operating system) such as Linux or a TRON and preferably can use a function provided by the OS such as the file managing function.

The image pickup device 152 includes an image pickup portion 156 which obtains image data by shooting an image, a scene classifying portion 11 which classifies the image data obtained by the image pickup portion 156, and an image processing portion 158 which carries out image processing on the image data according to the scene thereof.

The image processing portion 158 automatically carries out on the input image data image processing such as correction of the white balance or brightness adjustment according to the scene in which the image is classified by the scene classifying portion 11. Specifically, for example, when the white balance is to be corrected, the white balance of the normal image (the image classified as the other scenes when the image is to be classified into the underwater scene, the night scene, the sunset scene, and other scenes) is corrected so that the image becomes gray as the whole by obtaining histograms of RGB, whereas the white balance of the image which has been determined to be of the underwater scene is not corrected since, in the case of the image of the underwater scene, the state where the white balance is out of balance and the density B is stronger is regular. In the case of a night scene image, it is regular that the image is dark as the whole, and accordingly, the image processing of brightness adjustment is not carried out when the input image has been classified as of the night scene.

The output device 154 receives the processed image data by way of a network or reads the image data once stored in a recording medium by the image pickup device 152, and displays the image on the monitor of the output portion 153, prints the image or stores the image in a memory such as a photo-bank in a laboratory.

Figure 21:
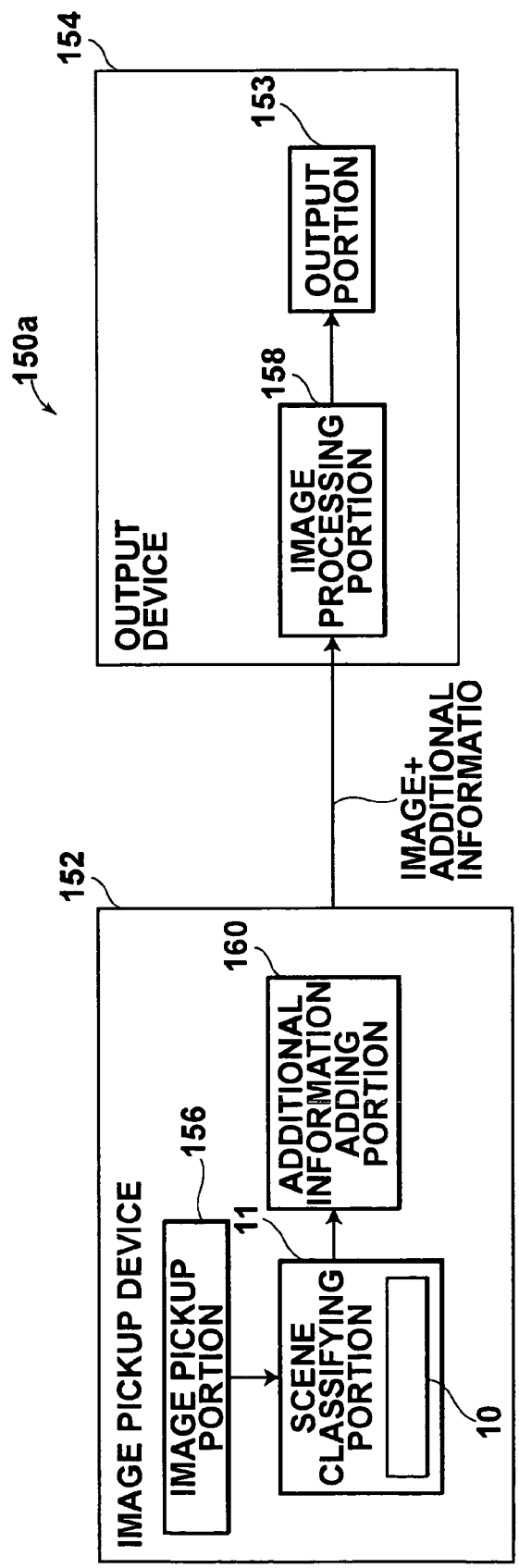
FIG. 21 is a block diagram showing a modification of the apparatus in accordance with the fifth embodiment of the present invention.

Otherwise, the image processing portion 158 may be provided in the output device 154 in place of the image pickup device 152 as in the system 150a shown in FIG. 21. In this case, the scene information obtained by the scene classifying portion 11 maybe added to the image data as additional information (e.g., tag information in Exif) in an additional information adding portion 160 and the image data added with the additional information may be delivered to the output device 154. By thus providing the image processing portion 158, image processing can be carried out according to the characteristics of the output device 154.

Sixth Embodiment

A sixth embodiment of the present invention will be described, below. In this embodiment, a system comprising an image pickup device such as a digital still camera or a cellular phone with a camera, an image processing device such as a personal computer and an output device such as a monitor, a printer or instruments installed in a laboratory (including a server in a photo-bank) will be described.

Figure 22:
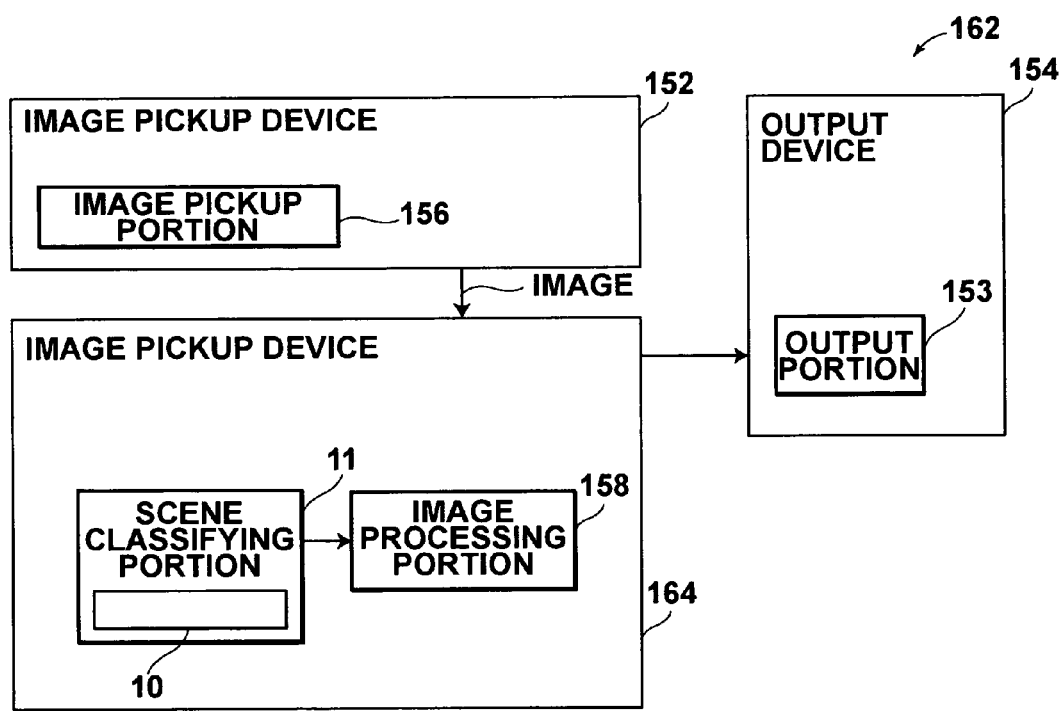
FIG. 22 is a block diagram showing the apparatus in accordance with a sixth embodiment of the present invention.

As shown in FIG. 22, the system 162 of this embodiment comprises the image pickup device 152, an image processing device 164 and the output device 154.

The image pickup device 152 comprises an image pickup portion 156 which obtains image data by shooting an image, and the image processing device 164 comprises the scene classifying portion 11 which classifies the image data and the image processing portion 158 which carries out image processing on the image data according to the scene thereof.

The image processing device 164 receives image data by way of a network from the image pickup device 152 or reads image data once stored in a recording medium by the image pickup device 152 and delivers the image data to the scene classifying portion 11. The image processing portion 158 carries out image processing on the image data according to the scene thereof.

Further, the image data processed by the image processing portion 158 is sent to the output device 154 by way of a network or a recording medium, and the output device 154 displays the processed image data on the monitor, prints the processed image data or stores the processed image data in a memory such as a photo-bank installed in a laboratory.

Figure 23:
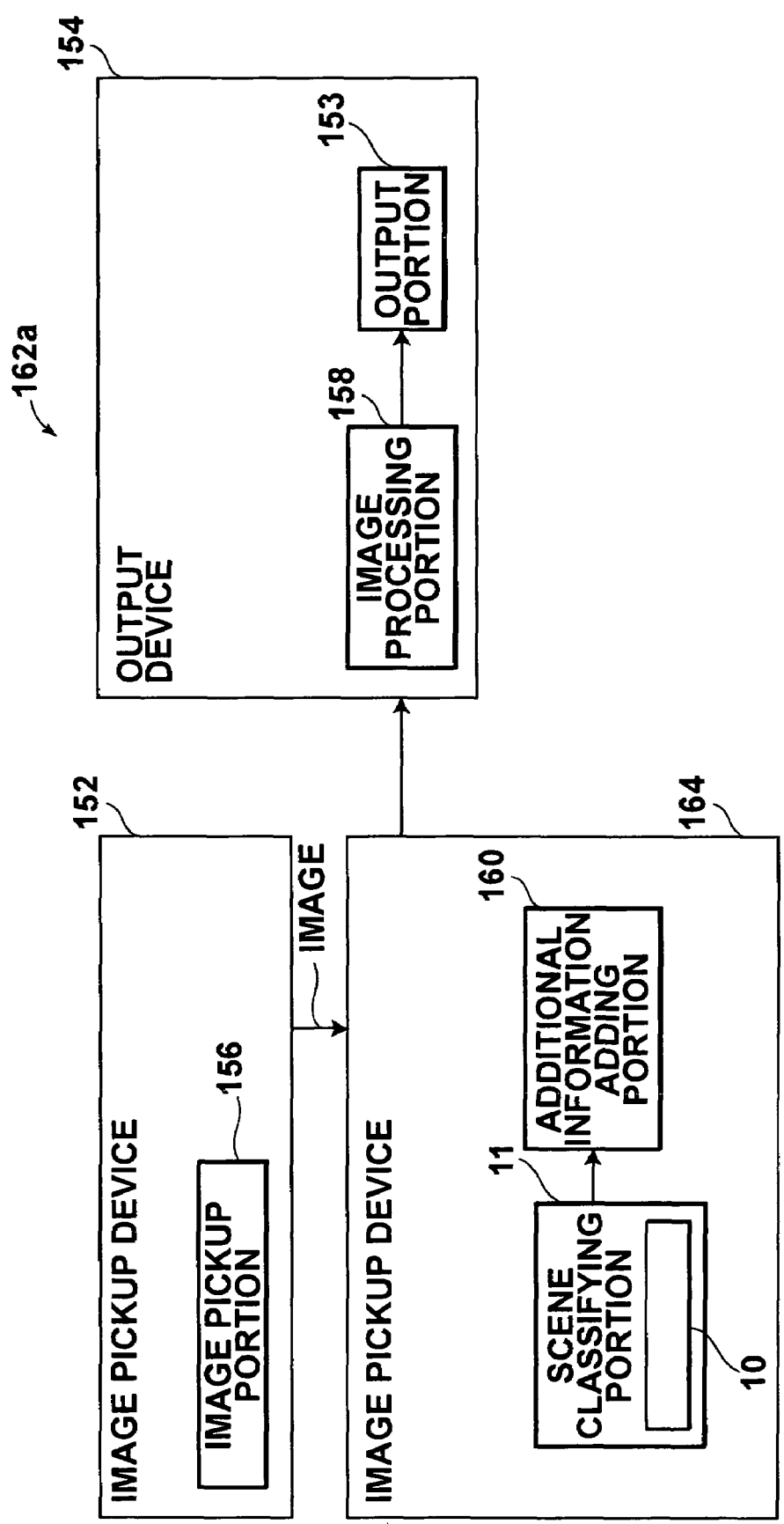
FIGS. 23 and 24 are block diagrams showing a modification of the system in accordance with the sixth embodiment of the present invention.

Otherwise, the image processing portion 158 may be provided in the output device 154 in place of the image processing device 164 as in the system 162a shown in FIG. 23. In this case, the scene information obtained by the scene classifying portion 11 may be added to the image data as additional information (e.g., tag information in Exif) in the additional information adding portion 160 and the image data added with the additional information may be delivered to the output device 154. By thus providing the image processing portion 158, image processing can be carried out according to the characteristics of the output device 154.

Figure 24:
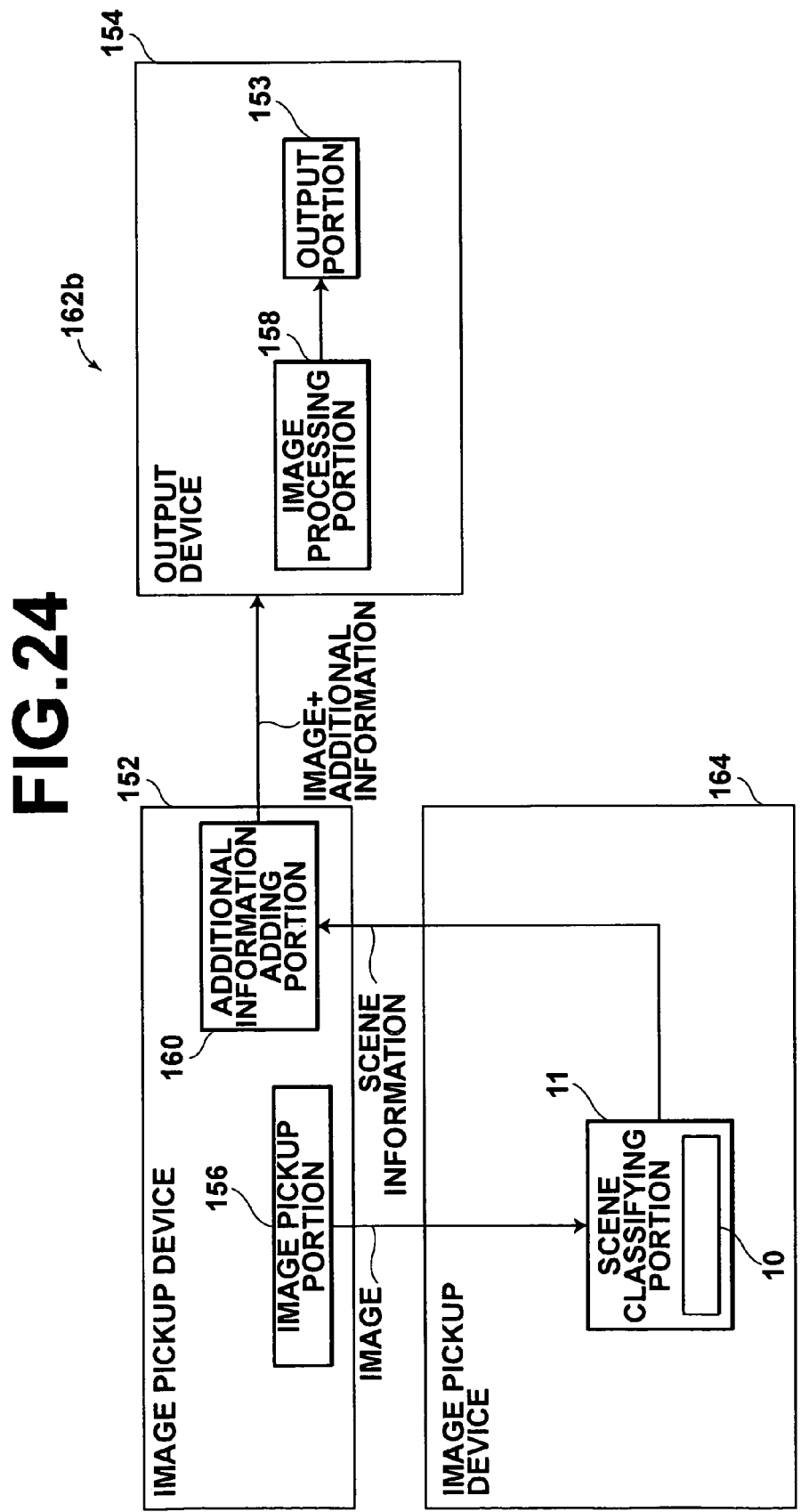

Further, as in the system 162b shown in FIG. 24, the image processing device 164 may comprise only the scene classifying portion 11 and classify the image data, which, for instance, has received from the image pickup device 152 by way of a network so that the image processing device 164 transfers only the scene information thereby obtained again to the image pickup device 152 by way of the network.

Seventh Embodiment

A seventh embodiment of the present invention will be described, below. In this embodiment, a system comprising an image pickup device such as a digital still camera or a cellular phone with a camera and an output device such as a monitor, a printer or instruments installed in a laboratory (including a server in a photo-bank) will be described. In this embodiment, the output device has a function of the scene classification.

Figure 25:
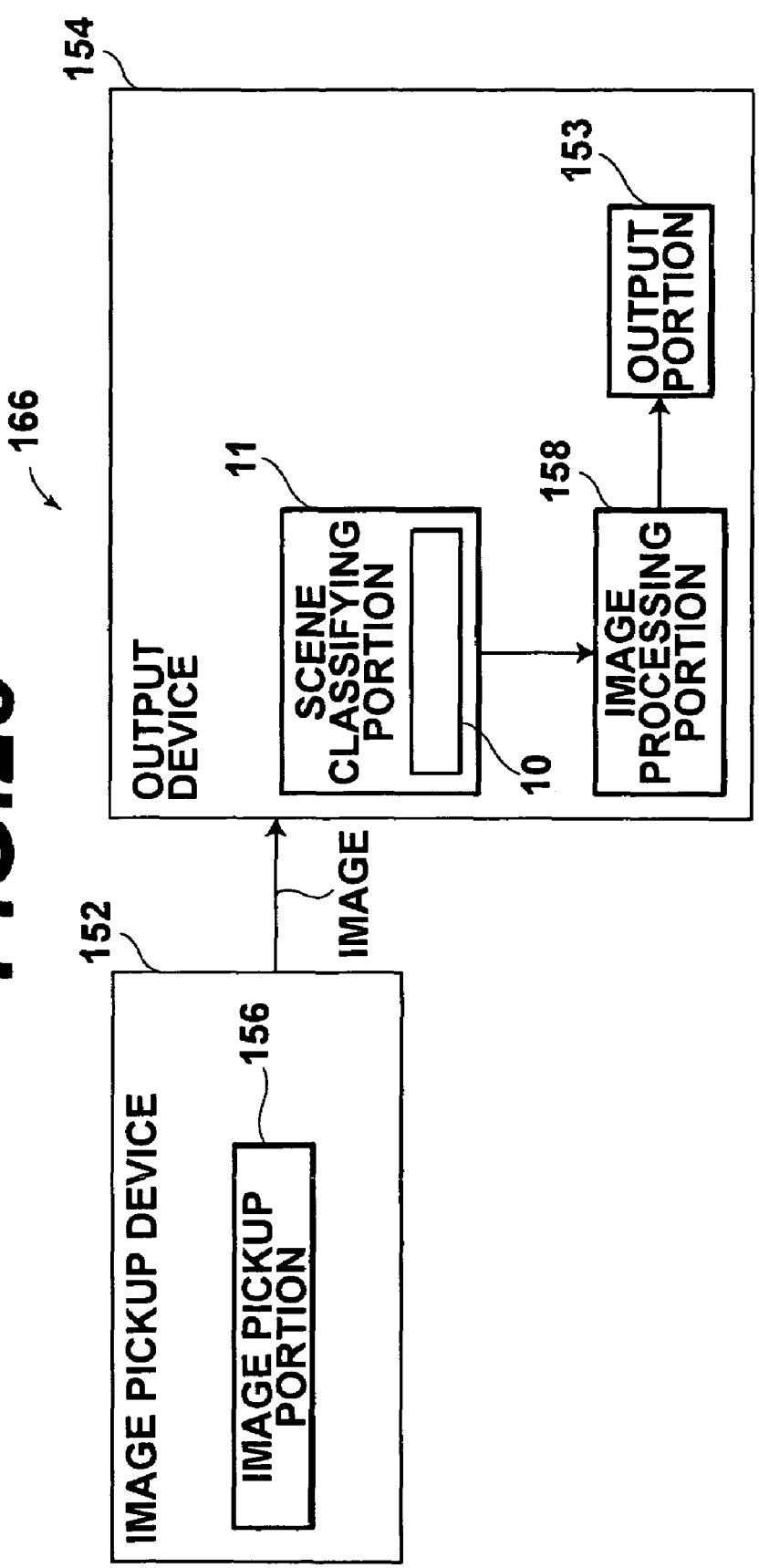
FIG. 25 is a block diagram showing the system in accordance with a seventh embodiment of the present invention.

As shown in FIG. 25, the image pickup device 152 of the system 166 of this embodiment comprises only the image pickup portion 154, and the scene classifying portion 11 and the image processing portion 158 are provided in the output device 154.

The output device 154 receives the image data from the image pickup device 152 by way of a network or a recording medium, and causes the scene classifying portion 11 to classify the image data and the image processing portion 158 to carry out image processing on the image data according to the scene thereof.

In the fifth to seventh embodiments, the scene classifying portion is provided in the image pickup device, the image processing device or the output device. The classified image data maybe stored in different holders depending on the scenes in a memory (e.g., such as a server or a recording medium in a photo-bank) provided in the image pickup device, the image processing device or the output device. Further, when the image data is stored in different holders in the output device (e.g., such as a server computer in a photo-bank provided in a laboratory), the index print maybe made for each holder.

Further, the types of the characteristic quantities which the identifier uses depending on the operating power of the program executing environment and/or the desired processing speed and/or the number of the characteristic quantities which are used for identification of the scene in the apparatus 10 may be changed depending on in which device the apparatus 10 for distinguishing the image of the specific scene is provided.

Eighth Embodiment

A eighth embodiment of the present invention will be described, below. In this embodiment, the image pickup device such as a digital still camera or a cellular phone with a camera has a function of the scene classification and the function of the scene classification is interlocked with the shooting mode set in the image pickup device.

Figure 26:
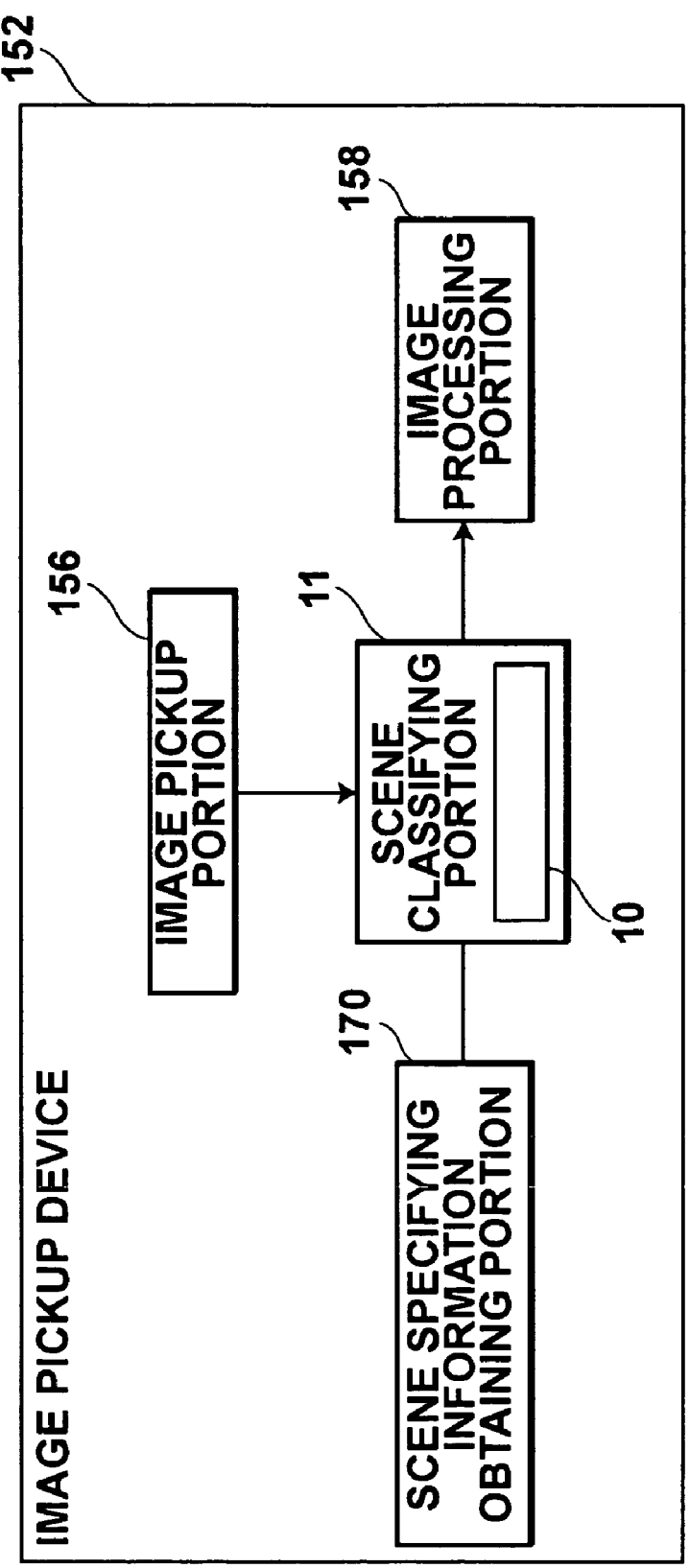
FIG. 26 is a block diagram showing the system in accordance with a eighth embodiment of the present invention.

As shown in FIG. 26, the image pickup device 152 comprises an image pickup portion 156 which obtains image data by shooting an image, a scene classifying portion 11 which classifies the image data obtained by the image pickup portion 156, an image processing portion 158 which carries out image processing on the image data according to the scene thereof, and a scene specifying information obtaining portion 170 which obtains information for specifying the scene such as the shooting mode upon shooting the image.

The image pickup device 152 such as a digital still camera sometimes has a function of designating the shooting mode such as a night scene mode or a sunset scene mode. When the user designates a shooting mode in view of the environmental conditions upon shooting, an image is shot with the designated shooting mode.

The scene specifying information obtaining means 170 obtains the shooting mode as the information for specifying the scene, and the scene classifying portion 11 determines whether the image obtained by the shooting is of the scene designated by the shooting mode.

FIG. 27 is a flow chart for illustrating operation of the image pickup device of this embodiment.

If the shooting mode when the image pickup portion 156 obtains image data (step 180) is determined as the automatic mode designated by the user (step 182), the image data of the shot image is classified by the scene classification portion 11 (step 184). Then, the image processing portion 158 carries out the image processing on the classified image data, in accordance with the classified scene (step 186).

Whereas, if the shooting mode is determined as the night scene mode designated by the user (step 182), the scene classifying portion 11 classifies the image data of the shot image (step 188). When it is determined in step 190 that the image data is of the night scene, the image processing portion 158 processes the image data in accordance with the night scene (step 192). While, if it is determined in step 190 that the image data is not of the night scene, an alarm message to the effect that "Is the image processing to be carried out according to the night mode?" is displayed, e.g., on the LCD display of the digital still camera to prompt the user to confirm the shooting mode (step 194).

If the user instructs in step 196 to process the image data as the night scene, the image processing portion 158 carries out the image processing on the image data according to the night scene (step 192). Whereas when the user instructs in step 196 not to process the image data as the night scene, the image processing portion 158 carries out the normal image processing on the image data (step 198).

Further, the scene information (e.g., tag information in Exif) is recorded on a recording medium or the memory of the image pickup device in addition to the image data according to the scene determined.

(Step 200)

The classifying portion 11 either may classify the input image into the underwater scene, the night scene, the sunset scene, and other scenes, or may determine only whether or not the image data is of the night scene.

Though, in the embodiment described above, whether the actual shot image conforms to the set shooting mode is determined, information such the shooting time or whether the strobe light was used may be obtained in the scene specifying information obtaining means 170 as the information for specifying the scene in addition to the shooting mode.

For example, when the clock built in the image pickup device shows that the image is shot in the night, there is a strong probability that the image is of the night scene but there is a weak probability that the image is of a blue sky scene which was shot in the fine outdoors. Accordingly, when the clock built in the image pickup device shows that the image is shot in the night, the threshold value for determining that the image is of the night scene may be reduced and/or the identification points for the night scene may be increased so that the image becomes more apt to be determined to be of the night scene. Further, when there is a strong probability that the image is of the night scene but there is hardly a probability that the image is of the fine weather scene, the identification for determining whether the image is of the fine weather scene may be skipped.

Further, when the image was shot with the strobe light on, there is a weak probability that image is of the fine weather scene, and accordingly, the identification process for determining whether the image is of the fine weather scene may be skipped.

Further, when the camera is provided with a clock, a sensor for detecting the shooting direction and a position sensor like a GPS for detecting the shooting position, the relation between the position of the camera and the position of the sun upon shooting can be known from the shooting time, the shooting direction and the shooting position, and accordingly, when the image was shot in daylight toward the sun, the image can be of a backlight scene. Those information may be obtained as the information for specifying the scene and the scene may be identified according to the scene when the image is shot.

By thus obtaining information for specifying the scene, the identifying accuracy can be increased.

Further, by adding the information for specifying the scene obtained by the image pickup device to the image as the additional information, the identifying accuracy can be increased by referring to the information.

The preferred embodiments of the invention described above in detail are merely examples, and it is intended that the appended claims cover the true spirit and scope of the present invention.

What is claimed is:

1. An apparatus for selecting an image of a specific scene, said apparatus comprising:
    an image input reception portion for receiving input of a target image;
    a local characteristic quantity image generation portion for generating at least a local characteristic quantity image from said target image;
    a representative characteristic quantity calculation portion for calculating at least a representative characteristic quantity for the each local characteristic quantity image by using a result of sum-of-product calculations obtained by shifting and/or changing distribution of at least a mask in the corresponding local characteristic quantity image, wherein said each mask is previously related to a type of the local characteristic quantity image; and
    a identification portion for making judgment as to whether the target image indicates the specific scene by comparing at least a value of the representative characteristic quantity with a identification condition previously related to a type of the representative characteristic quantity, wherein said identification condition indicates a relationship between a possible value of the representative characteristic quantity and likelihood of the specific scene,
    wherein the local characteristic quantity image is an image having the values of characteristic quantities that represent the characteristics of pixels of a portion or a region of a selection target image as pixel values.

2. The apparatus according to claim 1, further comprising:
    a scene specification reception portion for receiving specification of a desired scene as the specific scene.

3. The apparatus according to claim 1,
    wherein the type of the local characteristic quantity image generated by the local characteristic quantity image generation portion, a type of the mask used by the representative characteristic quantity calculation portion, the type of the representative characteristic quantity calculated by the representative characteristic quantity calculation portion, and the identification condition for the type of the representative characteristic quantity are determined through learning in advance a sample image group including images previously defined as the specific scene and images previously defined as not the specific scene.

4. The apparatus according to claim 1,
    wherein the local characteristic quantity image or at least one of the local characteristic quantity images has values of a local characteristic quantity as pixel values thereof, the local characteristic quantity indicating probability of a pixel corresponding to an area having a combination of a plurality of characteristics.

5. The apparatus according to claim 4,
    wherein the combination of the characteristics includes two or more characteristics selected from a group of characteristics regarding hue, saturation, lightness and texture.

6. The apparatus according to claim 3,
    wherein, during the learning with respect to the each specific scene,
    a plurality of candidate combinations of the type of the local characteristic quantity image, the type of the mask, and the type of the representative characteristic quantity that can be used for the judgment of the specific scene, is defined,
    a representative characteristic quantity whose type is specified by the candidate combination, is calculated with respect to the each candidate combination from each image of the sample image group by using a local characteristic quantity image and a mask whose types are specified by the candidate combination,
    a trial selection is carried out for setting an identification criterion utilized for identifying whether or not said each image of the sample image group is defined as an image of the specific scene,
    one or more candidate combinations to be utilized for selecting the image of the specific scene are selected in order of higher accuracy of the identification criterion obtained by the trial selection, and
    an identification condition with respect to the each selected candidate combination is determined with reference to the identification criterion set for the each selected combination.

7. The apparatus according to claim 6,
    wherein the local characteristic quantity image in at least one of the candidate combinations has values of a local characteristic quantity indicating probability of a pixel corresponding to an area of a characteristic in a predetermined range, as pixel values thereof, and
    wherein, during the learning with respect to the each specific scene, the identification criterion set for the each selected candidate combination is corrected by adjusting the predetermined range so as to improve identification accuracy for the images of the sample image group in the case that the local characteristic quantity image in the selected candidate combination have values of the local characteristic quantity indicating the probability as pixel values thereof, after one or more the candidate combinations are selected and before the identification condition is determined.

8. The apparatus according to claim 6,
    wherein the local characteristic quantity image of at least one of the combinations have values of a local characteristic quantity indicating probability of a pixel corresponding to an area having a combination of a plurality of characteristics, as pixel values thereof.

9. The apparatus according to claim 8,
    wherein the combination of the characteristics is a combination of two or more characteristics selected from a group comprising characteristics of hue, saturation, lightness and texture.

10. The apparatus according to claim 1, further comprising:
    a correct identification reception portion for receiving specification of a correct scene represented by the target image if a result of the judgment was wrong; and an additional learning portion for updating the identification condition by learning the target image regarding which the specification of the correct scene was received.

11. A tangible computer-readable medium storing a program for selecting an image of a specific scene, the program causing a computer to function as:
- image input reception means for receiving input of a target image;
- local characteristic quantity image generation means for generating at least a local characteristic quantity image from the target image;
- representative characteristic quantity calculation means for calculating at least a representative characteristic quantity for the local characteristic quantity image by using a result of sum-of-product calculations obtained by shifting and/or changing distribution of at least a mask in the corresponding local characteristic quantity image, wherein said mask previously related to a type of the local characteristic quantity image; and
- selection means for recognizing whether or not the target image indicates the specific scene by comparing at least a value of the representative characteristic quantity with a identification condition previously related to a type of the representative characteristic quantity, wherein said identification condition indicating a relationship between a possible value of the representative characteristic quantity and likelihood of the specific scene,
- wherein the local characteristic quantity image is an image having the values of characteristic quantities that represent the characteristics of pixels of a portion or a region of a selection target image as pixel values.

12. A computer-readable recording medium storing a program for selecting an image of a specific scene, the program causing a computer to function as:
- image input reception means for receiving input of a target image;
- local characteristic quantity image generation means for generating at least a local characteristic quantity image from the target image;
- representative characteristic quantity calculation means for calculating at least a representative characteristic quantity for the local characteristic quantity image by using a result of sum-of-product calculations obtained by shifting and/or changing distribution of at least a mask in the corresponding local characteristic quantity image, wherein said mask is previously related to a type of the local characteristic quantity image; and
- selection means for recognizing whether or not the target image indicates the specific scene by comparing at least a value of the representative characteristic quantity with a identification condition previously related to a type of the representative characteristic quantity or quantities, wherein the identification condition indicates a relationship between a possible value or possible values of the representative characteristic quantity or quantities and likelihood of the specific scene,
- wherein the local characteristic Quantity image is an image having the values of characteristic quantities that represent the characteristics of pixels of a portion or a region of a selection target image as pixel values.

13. An image pickup device comprising:
- an image pickup portion which obtains image data of a shot image;
- a scene designation reception portion which receives designation of a desired specific scene;
- a local characteristic quantity image generation portion for generating at least a local characteristic quantity image from said obtained image data;
- a representative characteristic quantity calculation portion for calculating at least a representative characteristic quantity for the each local characteristic quantity image by using a result of sum-of-product calculations obtained by shifting and/or changing distribution of at least a mask in the corresponding local characteristic quantity image, wherein said each mask is previously related to a type of the local characteristic quantity image; and
- an identification portion for making judgment as to whether said obtained image data indicates the specific scene by comparing at least a value of the representative characteristic quantity with a identification condition previously related to a type of the representative characteristic quantity, wherein said identification condition indicates a relationship between a possible value of the representative characteristic quantity and likelihood of the specific scene,
- wherein the local characteristic quantity image is an image having the values of characteristic quantities that represent the characteristics of pixels of a portion or a region of a selection target image as pixel values.

14. The image pickup device according to claim 5, further comprising:
- a scene specifying information obtaining portion which obtains information for specifying the scene upon shooting the image,
- wherein said scene designation reception portion receives designation of a desired specific scene with reference to the information for specifying the scene obtained by said scene specifying information obtaining portion.

15. A specific scene image identification method comprising:
- receiving input of a target image;
- generating at least a local characteristic quantity image from said target image;
- calculating at least a representative characteristic quantity for the each local characteristic quantity image by using a result of sum-of-product calculations obtained by shifting and/or changing distribution of at least a mask in the corresponding local characteristic quantity image, wherein said each mask is previously related to a type of the local characteristic quantity image; and
- making judgment as to whether the target image indicates the specific scene by comparing at least a value of the representative characteristic quantity with a identification condition previously related to a type of the representative characteristic quantity, wherein said identification condition indicates a relationship between a possible value of the representative characteristic quantity and likelihood of the specific scene,
- wherein the local characteristic quantity image is an image having the values of characteristic quantities that represent the characteristics of pixels of a portion or a region of a selection target image as pixel values.

16. An apparatus for selecting an image of a specific scene, said apparatus comprising:
- an image input reception portion for receiving input of a target image;
- a local characteristic quantity image generation portion for generating at least a local characteristic quantity image from said target image;
- a representative characteristic quantity calculation portion for calculating at least a representative characteristic quantity for the each local characteristic quantity image by using a result of sum-of-product calculations obtained by shifting and/or changing distribution of at least a mask in the corresponding local characteristic quantity image, wherein said each mask is previously related to a type of the local characteristic quantity image; and a identification portion for making judgment as to whether the target image indicates the specific scene by comparing at least a value of the representative characteristic quantity with a identification condition previously related to a type of the representative characteristic quantity, wherein said identification condition indicates a relationship between a possible value of the representative characteristic quantity and likelihood of the specific scene, wherein the type of the local characteristic quantity image generated by the local characteristic quantity image generation portion, a type of the mask used by the representative characteristic quantity calculation portion, the type of the representative characteristic quantity calculated by the representative characteristic quantity calculation portion, and the identification condition for the type of the representative characteristic quantity are determined through learning in advance a sample image group including images previously defied as the specific scene and images previously defined as not the specific scene, wherein, during the learning with respect to the each specific scene, a plurality of candidate combinations of the type of the local characteristic quantity image, the type of the mask, and the type of the representative characteristic quantity that can be used for the judgment of the specific scene, is defined, a representative characteristic quantity whose type is specified by the candidate combination, is calculated with respect to the each candidate combination from each image of the sample image group by using a local characteristic quantity image and a mask whose types are specified by the candidate combination, the accuracy of an identification criterion for each candidate combination is determined, one or more candidate combinations to be utilized for selecting the image of the specific scene are selected in order of higher accuracy of the identification criterion, and an identification condition with respect to the each selected candidate combination is determined with reference to the identification criterion set for the each selected combination.

17. The apparatus according to claim 1, wherein said mask comprises a weighted matrix.

* * * * *